(12) United States Patent
Kobayashi

(10) Patent No.: US 11,500,353 B2
(45) Date of Patent: Nov. 15, 2022

(54) CONTROL METHOD OF ROBOT SYSTEM, AND ROBOT SYSTEM

(71) Applicant: CANON KABUSHIKI KAISHA, Tokyo (JP)

(72) Inventor: Takayuki Kobayashi, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 16/879,581

(22) Filed: May 20, 2020

(65) Prior Publication Data

US 2020/0285217 A1 Sep. 10, 2020

Related U.S. Application Data

(63) Continuation of application No. 15/575,973, filed as application No. PCT/JP2016/002922 on Jun. 17, 2016, now Pat. No. 10,698,384.

(30) Foreign Application Priority Data

Jun. 23, 2015 (JP) ................................ 2015-125284

(51) Int. Cl.
*B25J 9/16* (2006.01)
*G05B 19/406* (2006.01)

(52) U.S. Cl.
CPC .......... *G05B 19/406* (2013.01); *B25J 9/1697* (2013.01); *G05B 2219/35291* (2013.01)

(58) Field of Classification Search
CPC ... G06F 11/3476; G06F 17/40; G05B 19/406; G05B 19/056; G05B 2219/13004
See application file for complete search history.

(56) References Cited

U.S. PATENT DOCUMENTS 4,868,474 A 9/1989 Lancraft
6,438,454 B1 8/2002 Kuroki
(Continued)

FOREIGN PATENT DOCUMENTS

CN 1372505 10/2002
CN 103793479 5/2014
(Continued)

OTHER PUBLICATIONS

Traub et al., Scenario extraction fora refined timing-analysis of automotive network topologies, 2010, IEEE, p. 1-6 (Year: 2010).*
(Continued)

*Primary Examiner* — McDieunel Marc
(74) *Attorney, Agent, or Firm* — Venable LLP

(57) ABSTRACT

In a robot system, a data amount of operation information (log) to be transferred or recorded is reduced, thereby enabling the operation information (log) to be transferred or recorded with a low load. The system has a control unit for controlling the operation of a robot of a robot device and transfers a log regarding the robot operation to a managing terminal. While making the robot operative, the control unit generates log data regarding the robot operation and stores into a short-term storage log recording unit (temporary storage device) (log data generating step). When log transfer timing comes, a part of the log data stored in the recording unit (temporary storage device) is extracted and transferred as a log to a log storage device in accordance with the robot operation (log transferring step).

30 Claims, 14 Drawing Sheets

(56) References Cited

U.S. PATENT DOCUMENTS

| | | | |
|---|---|---|---|
| 6,556,892 B2 | 4/2003 | Kuroki | |
| 6,871,004 B1* | 3/2005 | Bando | G01C 21/20 |
| | | | 386/201 |
| 6,968,116 B2* | 11/2005 | Bando | G01C 21/20 |
| | | | 386/201 |
| 7,302,312 B2 | 11/2007 | Murry | |
| 2002/0120361 A1 | 8/2002 | Kuroki | |
| 2007/0011195 A1* | 1/2007 | Kutsumi | G06Q 30/02 |
| 2008/0163094 A1 | 7/2008 | Pannese | |
| 2010/0240360 A1* | 9/2010 | Watanabe | H04B 17/23 |
| | | | 455/425 |
| 2011/0231886 A1* | 9/2011 | Mori | H04N 21/2393 |
| | | | 725/116 |
| 2012/0254309 A1* | 10/2012 | Tokashiki | G06F 11/3476 |
| | | | 709/204 |
| 2015/0169288 A1* | 6/2015 | Yamamoto | G06F 11/3006 |
| | | | 707/752 |
| 2016/0216914 A1* | 7/2016 | Yamada | G06F 11/3466 |
| 2018/0150051 A1* | 5/2018 | Kobayashi | B25J 9/1697 |

FOREIGN PATENT DOCUMENTS

| | | |
|---|---|---|
| DE | 102013109823 | 3/2014 |
| EP | 1 935 578 | 1/2012 |
| JP | 10-328976 | 12/1998 |
| JP | 2001-125612 | 5/2001 |
| JP | 2003-103485 | 4/2003 |
| JP | 2003-103485 A | 4/2003 |
| JP | 2006-260434 | 9/2006 |
| JP | 20084112 | 1/2008 |
| JP | 2008-102865 | 5/2008 |
| JP | 2008-217730 | 9/2008 |
| JP | 2011-56589 | 3/2011 |
| JP | 2014-34095 | 2/2014 |
| JP | 2014-104561 | 6/2014 |
| JP | 2014-117720 | 6/2014 |
| JP | 2015-112631 A | 6/2015 |
| JP | 2017-07036 A | 1/2017 |

OTHER PUBLICATIONS

Luo et al., Achieving Repeatability of Asynchronous Events in Wireless Sensor Networks with EnviroLog, 2006, IEEE, p. 1-14 (Year: 2006).*

Fu et al., Execution Anomaly Detection in Distributed Systems through Unstructured Log Analysis, 2009, IEEE, p. 149-158 (Year: 2009).*

Zulkernine et al., Towards a Training-Oriented Adaptive Decision Guidance and Support System, 2012, IEEE, pg. (Year: 2012).*

Chinese Office Action dated Mar. 19, 2020 during prosecution of related Chinese application No. 201680036749.9, with whole English translation (Cited during prosecution of parent U.S. Appl. No. 15/575,973.).

Japanese Office Action dated Dec. 24, 2019 during prosecution of related Japanese application No. 2015-125284, with English language translation. (Cited during prosecution of parent U.S. Appl. No. 15/575,973.).

Japanese Office Action dated Jun. 4, 2019 during prosecution of related Japanese application No. 2015-125284, with English language translation (Cited during prosecution of parent U.S. Appl. No. 15/575,973.).

German Office Action dated May 30, 2018 during prosecution of related German application No. 11 2016 002 853.9, with English language translation (Cited during prosecution of parent U.S. Appl. No. 15/575,973.).

PCT International Search Report and Written Opinion of the International Searching Authority in PCAT/JP2016/002922, dated Sep. 13, 2016 (Cited during prosecution of parent U.S. Appl. No. 15/575,973.).

Carrico et al., Cognitive situation monitoring and awareness of grid systems, 2005, IEEE, p. 1-6 (Year: 2005).

Guan et al., Extending Pervasive Devices with the Semantic Grid: A Service Infrastructure Approach, 2006, IEEE, p. 1-6 (Year 2006).

Namgoong et al., An Adaptive User Interface in Smart Environment exploiting Semantic Descriptions, 2006, IEEE, p. 1-6 (Year 2006).

Jusho et al., An Intelligent human-robot interface using a probability approach, 2004, IEEE, p. 4461-4465 (Year: 2004).

Japanese Office Action dated Aug. 4, 2020 in corresponding Japanese application No. 2015-125284 (with whole English language translation).

Japanese Office Action dated Mar. 29, 2022 in corresponding Japanese application No. 2021-060968 (with whole English language translation).

Japanese Office Action dated Aug. 30, 2022 in corresponding Japanese application No. 2021-060968 (with English language translation).

* cited by examiner

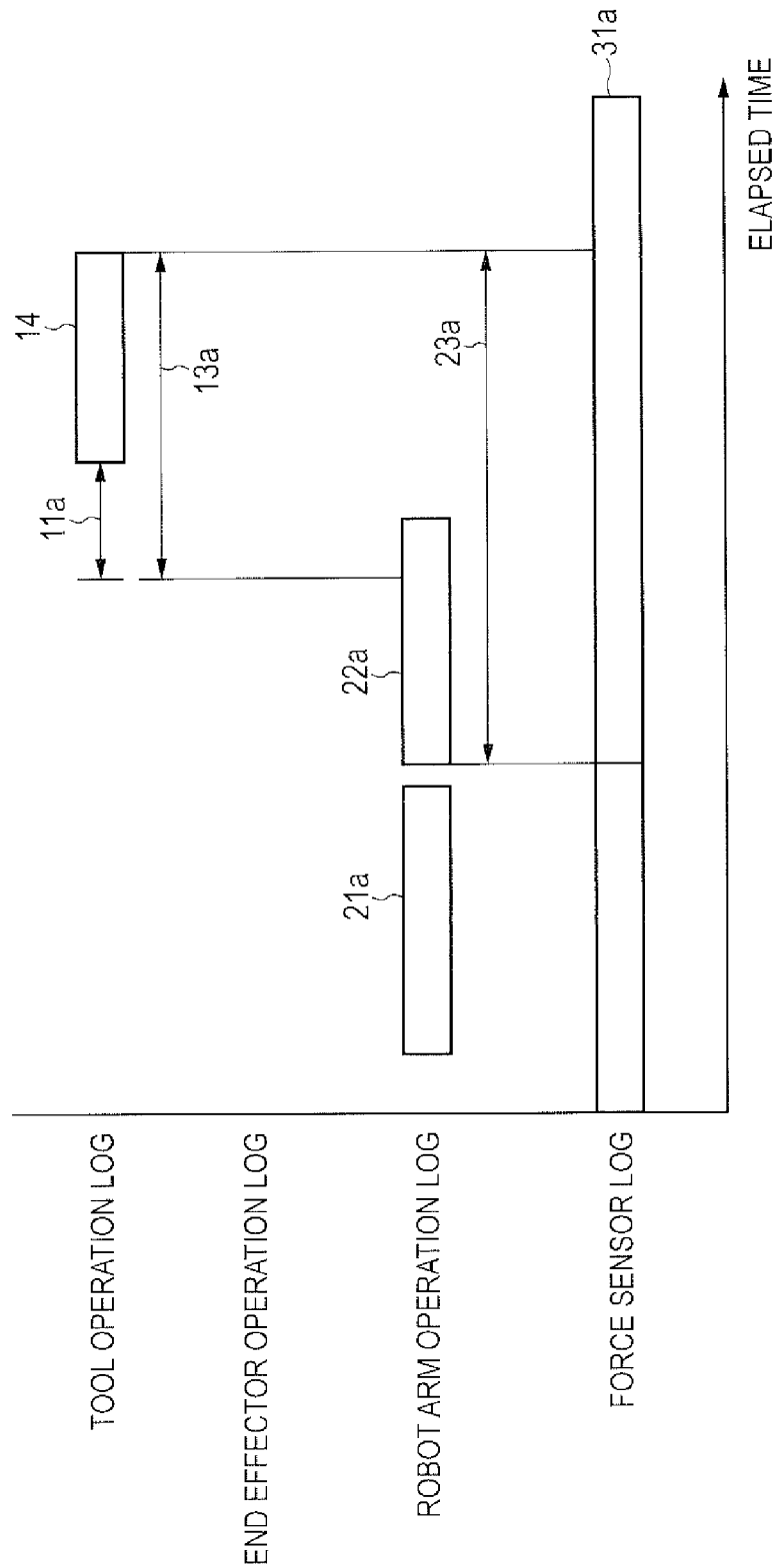

*FIG. 10A*

ROBOT ARM OPERATION LOG (TIME AXIS)

| DATE | TIME | TARGET POSITION [pulse] | | | | | | CURRENT POSITION [pulse] | | | | | |
|---|---|---|---|---|---|---|---|---|---|---|---|---|---|
| | | 1ST AXIS | 2ND AXIS | 3RD AXIS | 4TH AXIS | 5TH AXIS | 6TH AXIS | 1ST AXIS | 2ND AXIS | 3RD AXIS | 4TH AXIS | 5TH AXIS | 6TH AXIS |
| ... | ... | ... | ... | ... | ... | ... | ... | ... | ... | ... | ... | ... | ... |
| 2015/04/02 | 14:38:56.782917 | 1333686 | -327509 | 948580 | 308912 | 500422 | -533155 | 1333257 | -329058 | 949239 | 309056 | 500978 | -533498 |
| 2015/04/02 | 14:38:56.793902 | 1333832 | -326661 | 948081 | 308852 | 500002 | -532955 | 1333647 | -327023 | 948801 | 308991 | 500364 | -533091 |
| 2015/04/02 | 14:38:56.804932 | 1334236 | -324672 | 947502 | 308781 | 499628 | -532661 | 1333984 | -325566 | 948019 | 948019 | 500061 | -532919 |
| ... | ... | ... | ... | ... | ... | ... | ... | ... | ... | ... | ... | ... | ... |

*FIG. 10B*

END EFFECTOR OPERATION LOG (TIME AXIS)

| DATE | TIME | TARGET POSITION [pulse] | CURRENT POSITION [pulse] |
|---|---|---|---|
| 2015/04/02 | 14:38:57.547801 | 111915 | 111915 |
| 2015/04/02 | 14:38:57.557913 | 111915 | 111915 |
| 2015/04/02 | 14:38:57.568488 | 111915 | 111915 |
| ... | ... | ... | ... |

FIG. 11A

FORCE SENSOR LOG (TIME AXIS)

| DATE | TIME | FORCE [N] | | | TORQUE [Nm] | | |
|---|---|---|---|---|---|---|---|
| | | FX | FY | FZ | MX | MY | MZ |
| 2015/04/02 | 14:38:57.547801 | 1.16928711 | -0.81294922 | 14.99125977 | 0.0056882813 | 0.0355886719 | 0.0221126953 |
| 2015/04/02 | 14:38:57.557913 | 1.46928711 | -0.71294922 | 15.84125977 | 0.0076182813 | 0.0255889638 | 0.0261646221 |
| 2015/04/02 | 14:38:57.568488 | 1.56644531 | -0.44145508 | 15.21628906 | -0.0051679687 | 0.0557314453 | 0.0248431641 |
| ... | ... | ... | ... | ... | ... | ... | ... |

TOOL OPERATION LOG (TIME AXIS)

| DATE | TIME | TARGET POSITION [pulse] | CURRENT POSITION [pulse] |
|---|---|---|---|
| | | 1ST AXIS | 1ST AXIS |
| 2015/04/02 | 14:38:57.547801 | 16711 | 15310 |
| 2015/04/02 | 14:38:57.557913 | 16711 | 15928 |
| 2015/04/02 | 14:38:57.568488 | 16711 | 16711 |
| ... | ... | ... | ... |

| LOBOT EVENT LOG |
|---|

RE1 — 2015/04/02,14:38:56.018279 [SEND](ARM-MOVE)
x = 62.180046
y = 317.535563
z = 261.853801
tX = -179.774824
tY = 29.833870
tZ = -90.574931

RE2 — 2015/04/02,14:38:56.818279 [RECV](ARM-MOVE)
x = 62.180335
y = 317.535565
z = 261.853884
tX = -179.774783
tY = 29.833875
tZ = -90.574927
error = 0

RE3 — 2015/04/02,14:38:57.482912 [SEND](TOOL-MOVE)
Force = 15.000000
Limit = 0.919000

RE4 — 2015/04/02,14:38:57.673911 [RECV](TOOL-MOVE)
Pos = 2.363119
error = 0

CONTROL METHOD OF ROBOT SYSTEM, AND ROBOT SYSTEM

This application is a continuation of U.S. application Ser. No. 15/575,973, filed on Nov. 21, 2017, which is a National Stage under § 371 of International Application No. PCT/JP2016/002922, filed on Jun. 17, 2016, which claims priority to Japan 2015-125284, filed on Jun. 23, 2015, the entire contents of each of which is incorporated herein by reference.

TECHNICAL FIELD

The invention relates to a control method of a robot system which has a robot and a control unit for controlling an operation of the robot and which transfers a log regarding the operation of the robot to a log storage device, and relates to a robot system.

BACKGROUND ART

In recent years, in a factory manufacturing line, in place of a line production system suitable for mass production, the number of cell production systems which realize a production of multiple models in smaller lots which flexibly copes with needs of customers has been increasing. In the cell production system, one worker processes a plurality of working steps and produces one product (or a part of a product) in a working place called a cell for production. In the cell production system, there is also a case where a parts assembling operation to a work by the worker is executed by a robot cell in place of the worker and the cell production system is constructed by the robot cell.

In the robot cell, it is necessary that the precise and complicated assembling operation of a high difficulty degree which is executed by the worker is performed by a robot in place of the worker. For this purpose, there is a case where such robot control that a force sensor is provided for the robot and, while making force control, a work is assembled or the robot shifts a tool from one hand to the other in accordance with the work to be assembled and executes the operation is used.

In the robot system such as a robot cell, there is such a demand that the operator wants to store operation information for a period of time as long as possible for the purpose of performing an analyzing operation when a fault occurs. The operation information denotes sensor information such as outputs of an encoder and a force sensor arranged at each position such as a joint or the like besides control information of joints and an end effector of a robot arm and control information of various kinds of tools. A data file or a data stream of such operation information is generally called "log" or the like. There is a case where a transfer or a recording process of the operation information is called "logging" or the like. The logging of the operation information is performed to a storage device such as disk device, flash memory, or the like arranged in a control unit of the robot or the operation information is transferred and stored through a network into an external managing terminal of the robot device.

A data amount of the operation information increases in association with complexity of the assembling operation, the longer an operating period of time of the system is, such a data amount increases in association with it, and a load of a robot control unit or a network or an external managing terminal also increases due to the logging. In consideration of such a point, for example, such a construction that in at least either a case where a size of the operation information of the robot reaches a predetermined amount or a case where a predetermined time has passed, the operation information is transmitted to the external managing terminal through a communication network unit has been proposed (for example, the following Patent Literature 1).

CITATION LIST

Patent Literature

PTL 1: Japanese Patent Application Laid-Open No. 2003-103485

SUMMARY OF INVENTION

Technical Problem

According to the construction of foregoing PTL1, since the log transfer to the managing terminal is intermittently performed, it is considered that the load regarding the logging can be reduced for another period of time during which the log transfer is not performed. However, PTL1 is based on such a construction that all of the generated logs are transferred. Therefore, in such a robot system that a large amount of logs are generated due to a complexity of the operations and an increase in operating period of time, a load of a log transfer period of time becomes excessive and there is such a possibility that it exerts an influence on another normal operating period of time. When there is a limitation in a duration of the log transfer period of time, there is also such a possibility that the whole log cannot be transferred.

Solution to Problem

It is a subject of the invention that the foregoing problems are solved and, in a robot system, a data amount of operation information (log) to be transferred or recorded is reduced, thereby enabling the operation information (log) to be transferred or recorded with a low load.

To solve the above subject, according to the invention, there is provided a control method of a robot system which has a robot and a control unit for controlling an operation of the robot and transfers a log regarding the operation of the robot to a log storage device, comprising: a log data generating step of allowing the control unit to generate log data regarding the operation of the robot while making the robot operative and store into a temporary storage device; and a log transferring step of allowing the control unit to extract a part of the log data stored in the temporary storage device and transfer as a log to the log storage device in accordance with the operation of the robot when log transfer timing has come.

According to the above construction, a part of the log data stored in the temporary storage device can be extracted and transferred as log to the log storage device in accordance with the operation of the robot. Thus, in the robot system, there is such an excellent effect that a data amount of the operation information (log) to be transferred or recorded is reduced and the operation information (log) can be transferred or recorded with a low load.

Further features of the present invention will become apparent from the following description of exemplary embodiments with reference to the attached drawings.

BRIEF DESCRIPTION OF DRAWINGS

FIG. 9 is an explanatory diagram schematically illustrating a state of the log selection by the long-term storage log selecting unit in the robot system of FIG. 6.

FIG. 10A is an explanatory diagram illustrating a robot arm operation log of a robot device which can be processed by the embodiment 1 of the invention.

FIG. 10B is an explanatory diagram illustrating an end effector operation log of the robot device which can be processed by the embodiment 1 of the invention.

FIG. 11A is an explanatory diagram illustrating a force sensor log of a robot device which can be processed by the embodiment 2 of the invention.

FIG. 11B is an explanatory diagram illustrating a tool operation log of the robot device which can be processed by the embodiment 2 of the invention.

FIG. 12 is an explanatory diagram illustrating an event log of the robot device which can be processed by the invention.

DESCRIPTION OF EMBODIMENTS

Modes for carrying out the invention will be described hereinbelow with reference to embodiments illustrated in the attached drawings. The embodiments which will be mentioned hereinbelow are nothing but examples and, for instance, a construction of detailed portions can be properly modified by a person skilled in the art within a scope without departing from a spirit of the invention. Numerical values mentioned in the embodiments are reference numerical values and do not limit the invention.

Figure 1:
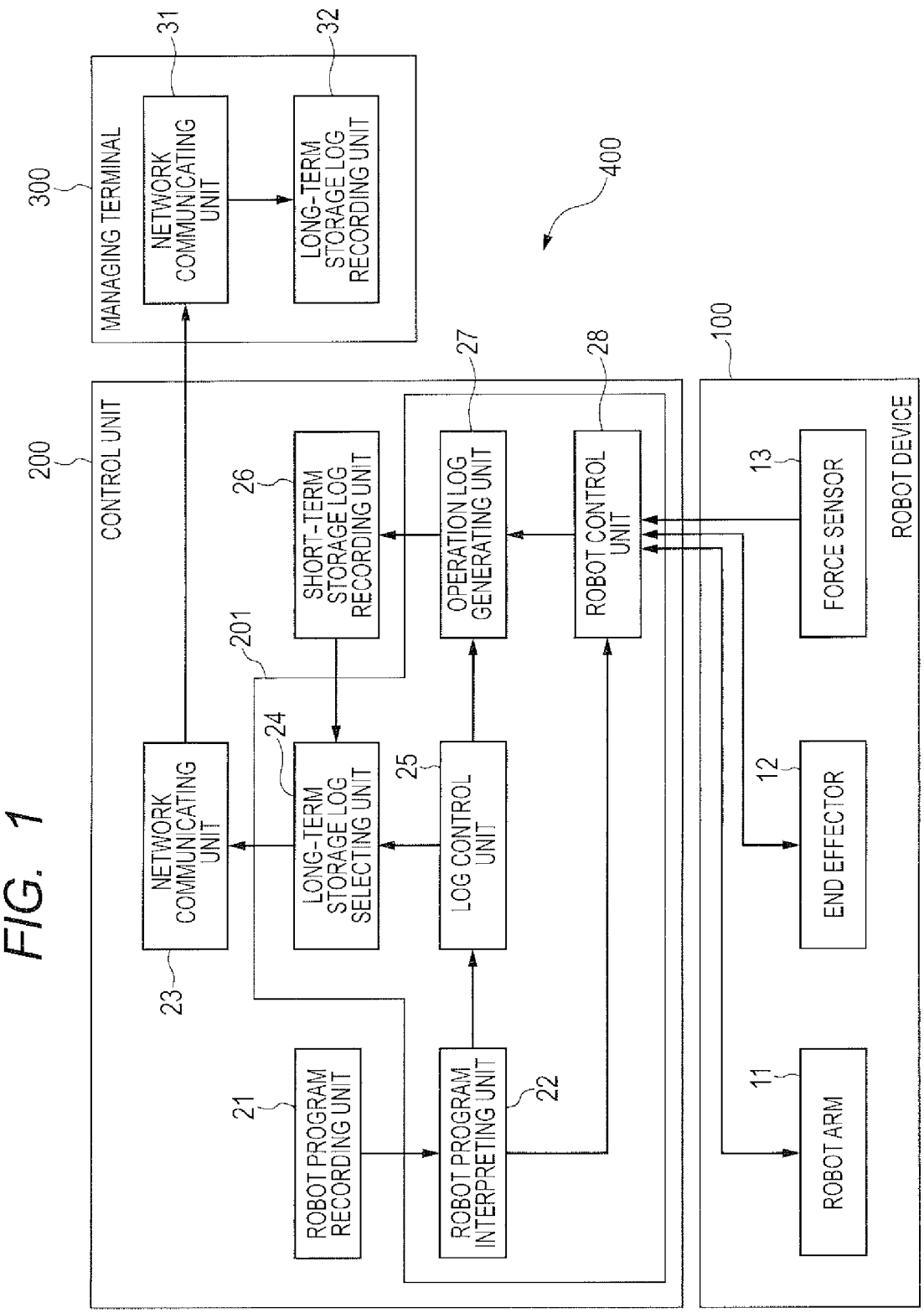
FIG. 1 is a block diagram illustrating a functional construction of a robot system which can embody the invention.

FIG. 1 illustrates a functional construction of a robot system which can embody the invention. FIG. 1 is an explanatory diagram illustrating a schematic construction of a robot device according to an embodiment 1 of the invention. A robot system 400 has a robot device 100, a control unit 200, and a managing terminal 300.

Figure 13:
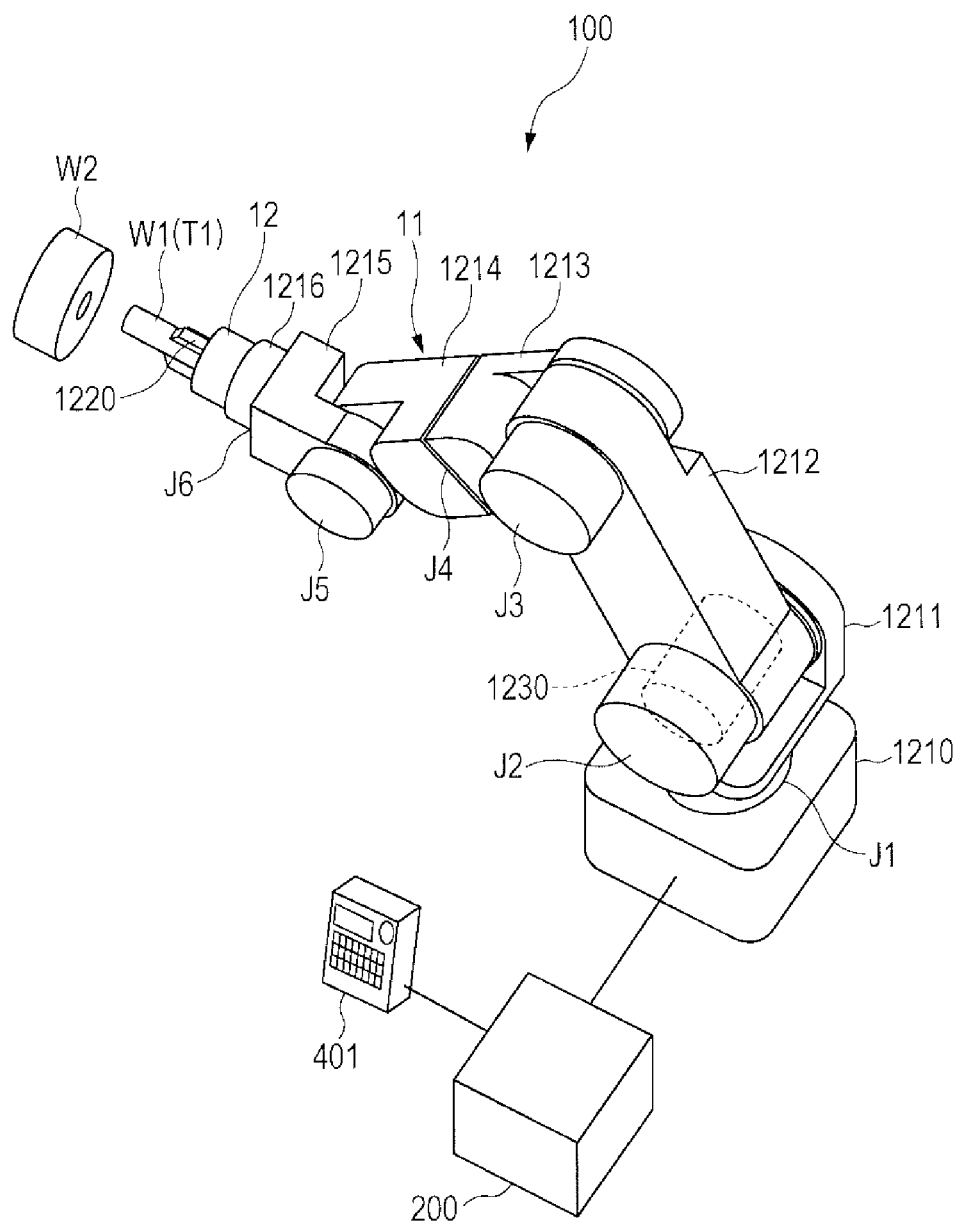
FIG. 13 is an explanatory diagram illustrating an external view of a robot system which can embody the invention.

The robot device 100 is, for example, an articulated robot for executing operations such as an assembling operation and the like as illustrated in FIG. 13. The robot device 100 includes a robot 11 and an end effector 12 attached to a tip of the robot. It is desirable that the robot 11 is an articulated robot arm 11. The larger the number of joints of the robot arm is, log data is accumulated every joint and an information amount is extremely large. Therefore, an effect of the invention becomes more remarkable. FIG. 13 is a diagram illustrating the $6^{TH}$ axis vertical articulated robot arm 11. The robot arm 11 has links 1211 to 1216 on a base 1210 so as to be sequentially mutually movably supported by joints J1 to J6. A driving mechanism 1230 as illustrated by a broken line with respect to the joint J2 is provided in each of the joints J1 to J6. The driving mechanism of the joint is constructed by using, for example, a rotation driving source such as a motor and reduction gears using a wave gear mechanism or the like.

In the case of FIG. 13, an operating device 401 is connected to the control unit 200. The operating device 401 has, for example, a keyboard for controlling the operations of the joints J1 to J6, a display for displaying various kinds of information, and the like and is used to teach the operation of the robot arm 11 in an installing site of the robot device 100. Such an operating device 401 is called, for example, a teaching pendant or the like. The control unit 200 may be built in the robot device 100 or may be a control device different from the robot device 100.

The end effector 12 is, for example, a hand, a gripper, or the like which is detachable to the link 1216 at a tip of the robot 11. Hereinbelow, there is a case where the robot 11 is called a robot arm 11. In FIG. 13, such a construction that the end effector 12 is constructed by a grasping mechanism such as a hand (or a gripper) having a finger 1220 is illustrated as an example. By controlling the grasping mechanism of the end effector 12 by the control unit 200 in an interlocking relational manner with the robot arm 11, for example, a work W1 is grasped and is assembled to a work W2, thereby enabling the robot arm 11 to execute an operation for manufacturing a specific article.

As shown by a reference character in the parentheses in FIG. 13, the end effector 12 grasps not only the work W1 but also a tool T1 such as an electric driver and can execute a machining or an assembling operation of a work (part) by the tool T1. In the following description, it is assumed that such a kind of tool T1 is used in a state where, for example, it is grasped by the end effector 12. However, a case where the tool T1 is directly attached, as one of the end effectors 12, to the link 1216 at the tip of the robot arm 11 is also considered in dependence on the specifications of the robot system. In the present Description, all of the mechanisms in which the tool T1 is detachable to the tip of the robot 11 are called an end effector. Therefore, the foregoing hand, gripper, and tool T1 are incorporated in the end effector 12.

In FIG. 1, there is a case where a force sensor 13 is provided for the robot arm 11 so that force control necessary to precisely assemble can be made. The force sensor 13 is constructed by, for example, a torque sensor or the like using a strain gauge or the like. The force sensor 13 is arranged, for example, near an attaching surface of the end effector 12 to the link 1216. The force sensor 13 detects, for example, a reaction force which acts in the direction perpendicular to the attaching surface of the end effector 12, a torque which acts around a center axis of the end effector 12, or the like when the work W1 or the tool T1 is operated. The robot arm 11 and the end effector 12 receive a control value having a predetermined data format from the control unit 200, execute the operation corresponding to the control value, and transmit a control result to the control unit 200. During the operation of the robot arm 11 and the end effector 12, the force sensor 13 transmits, for example, a detected force value to the control unit 200 at any time.

The driving mechanism 1230 of each of the joints J1 to J6 of the robot arm 11 receives the control value having the predetermined data format transmitted from the control unit 200 and executes the operation corresponding to the control value. The control unit 200 interprets, for example, a prepared robot program by a robot program interpreting unit 22, which will be described hereinafter, and determines control values of the joints J1 to J6 so that a predetermined portion such as a tip or the like of the robot arm 11 has a posture corresponding to a predetermined teaching point. An encoder (an angle sensor or a position detector) for detecting a rotational position of each of an input axis and an output axis of the reduction gears is arranged in the driving mechanism 1230 of each of the joints J1 to J6, for example, to each of those axes. In a manner similar to the case of the foregoing force sensor 13, outputs of sensors arranged with respect to the robot arm 11 are also successively transmitted to the control unit 200 during the operation of the robot arm 11. When the encoder such as a similar angle sensor or position detector is arranged with respect to a driving mechanism such as a grasping mechanism or the like of the end effector 12, their outputs are also transferred to the control unit 200 during the operation.

In FIG. 1, the control unit 200 has a CPU 201 as an arithmetic operating unit. The CPU 201 controls the operation of the robot device 100 serving as a control target in accordance with a robot program recorded in a robot program recording unit. A small block shown in a block 201 in FIG. 1 indicates a control function which is realized when the CPU 201 executes a control program.

The robot program interpreting unit 22 for interpreting the robot program stored in a robot program recording unit 21 is included in those functional blocks. A robot control unit 28 transmits a control command to the robot device 100 in accordance with a processing result of the robot program interpreting unit 22 and obtains the outputs of the sensors such as force sensor 13, encoder, and the like which are transmitted from the robot device 100 as mentioned above.

In the robot system 400 of the embodiment, a generation and a storage process of a log as operation information (operation data) of the robot device 100 are executed. Functional blocks of the CPU 201 for this purpose correspond to a log control unit 25, an operation log generating unit 27, and a long-term storage log selecting unit 24.

The operation log generating unit 27 generates log data regarding the operation of the robot arm 11 from the control value of the robot arm 11 which is input and output by the robot control unit 28 and the outputs of the sensors such as force sensor 13, encoder, and the like which are transmitted from the robot device 100. That is, the operation log generating unit 27 generates the log data from an output of a first sensor for detecting an operating state of a driving mechanism for driving the robot and an output of a second sensor for detecting an operating state of a driving mechanism for driving the end effector. The operation log generating unit 27 includes a first log generating unit for generating a log during the operation of the driving mechanism for driving the robot from an output value which is output from the first sensor. The operation log generating unit 27 also includes a second log generating unit for generating a log during the operation of the driving mechanism for driving the end effector from an output value which is output from the second sensor. The log data is constructed by, for example, a time stamp (time/date data) as illustrated in FIGS. 10A and 10B, which will be described hereinafter, and the like and event contents associated with it. The time stamp (time/date data) and the event contents associated therewith are, for example, the control value of the robot arm 11 and numerical value data of sensor information serving as actual values obtained from the sensors provided for the robot arm 11. The log data is expressed by a format such as text data constructed by (only) readable characters, binary data having a specific data width, or the like.

The log data which is generated by the operation log generating unit 27 is stored into, for example, a short-term storage log recording unit 26 constructed by a temporary storage device such as a RAM 203. As shown in a control procedure, which will be described hereinafter, the operation log generating unit 27 generates only the necessary log data in accordance with the operation contents of the robot arm 11 instead of generating the log data regarding all of the operations of the robot arm 11. Such a selective log data generation of the operation log generating unit 27 is executed in accordance with control of the log control unit 25.

That is, the operation log generating unit 27 corresponds to such a functional block for executing a log data generating step of allowing the control unit 200 to generate the log data regarding the operation of the robot arm 11 while making the robot arm 11 operative and store into the short-term storage log recording unit 26 (temporary storage device).

A specific part of the log data collected in the short-term storage log recording unit 26 is extracted by the long-term storage log selecting unit 24 at proper log transfer timing and is transferred to the external managing terminal 300 corresponding to a log storage device through a network communicating unit 23. In the Description, there is a case where the long-term storage log selecting unit 24 is called a transmitting unit. The long-term storage log selecting unit 24 extracts the specific part of the log data collected in the short-term storage log recording unit 26 in accordance with the operation of the robot arm which has been executed at, for example, the log transfer timing (for example, just before it). For example, the long-term storage log selecting unit 24 (transmitting unit) transmits: the second log within a period of time from the start of the operation of the end effector to the transfer; and the first log within a period of time from the timing which is precedent to the start of the operation of the end effector by a predetermined time to the transfer. A transmitting destination is constructed by, for example, an external storage device which can stably store a large amount of data for a long time, such as an HDD or optical disk device which can store the log for a long time. After the transmission, the log data may be deleted by a deleting unit for deleting the log data collected in the short-term storage log recording unit 26.

The long-term storage log selecting unit 24 corresponds to such a functional block that when the log transfer timing has come, the control unit 200 extracts a part of the log data in the short-term storage log recording unit 26 (temporary storage device) in accordance with the operation of the robot arm 11. This functional block further transfers the log data extracted as mentioned above, as a log, to the managing terminal 300 (log storage device). A log transferring step is constructed by those extraction and transfer of the log data by the long-term storage log selecting unit 24.

The managing terminal 300 can be installed, for example, in a form like a server computer for managing the operation information of the robot system. It is also considered that a network storage device such as an NAS can be used as a managing terminal 300. The managing terminal 300 in the embodiment includes: a network communicating unit 31 which can communicate with the network communicating unit 23 of the control unit 200; and a long-term storage log recording unit 32 for storing the log (long-term storage log) received from the control unit 200 side. The long-term storage log recording unit 32 is constructed by, for example, an external storage device which can stably store a large amount of data for a long time, such as an HDD or optical disk device.

A file of the log or a stream of the log which is extracted and transferred to the managing terminal 300 by the long-term storage log selecting unit 24 may be compressed by a predetermined data compressing system and transferred. Or, on the managing terminal 300 side, a received non-compressed file or stream of the log may be data-compressed and the log data after the compression may be stored in the long-term storage log recording unit 32. As such data compressing systems, naturally, a data compressing system which can efficiently compress the log expressed by a format such as text data, binary data, or the like can be selected.

The foregoing temporary storage device (RAM 203) stores the log data for a short term and the log storage device (managing terminal 300) stores the log data for a long term.

A system for encrypting the log and transmitting it may be used for the purpose of security in accordance with a network construction between the control unit 200 and the managing terminal 300. As such an encrypting system of the log, various kinds of well-known public key encrypting systems or the like can be used. The network between the control unit 200 and the managing terminal 300 can be also constructed by a network of a wireless connection besides a network of a wire connection.

A description will be made hereinbelow on the assumption that the managing terminal 300 of a form like, for example, a server computer as mentioned above is used as a log storage device. However, a transfer destination of the log extracted by the long-term storage log selecting unit 24 may be a log storage device of a local connection (instead of a network (remote) connection). For example, as such a log storage device of the local connection, an external storage device such as an HDD or optical disk device which has been built in the control unit 200 or has externally been attached is considered. Such a log storage device of the local connection is arranged in the control unit 200 or near the robot device 100 or the control unit 200 and is connected to the control unit 200 through an interface of a local connection (instead of a network (remote) connection).

As mentioned above, while making the robot arm 11 operative, the control unit 200 generates the log data regarding the operation of the robot arm 11 and stores into the temporary storage device (log data generating step). When the log transfer timing has come, the control unit 200 extracts a part of the log data in the short-term storage log recording unit 26 (temporary storage device) in accordance with the operation of the robot arm 11 and transfers as a log to the managing terminal 300 (log storage device) (log transferring step).

Thus, for example, only the log data of a necessary portion in the log data in the short-term storage log recording unit 26 (temporary storage device) can be extracted in accordance with the operation of the robot arm 11 and can be successively transferred as a log to the managing terminal 300 (log storage device) and stored therein. Therefore, a capacity of the log as robot operation information to be stored into the log storage device (managing terminal 300) is remarkably reduced and, if the log storage device is a device of the network connection, a band width necessary to transfer the log can be remarkably reduced.

A reference of the log data extraction which is executed by the long-term storage log selecting unit 24 is determined, for example, in accordance with the operation of the robot arm which has been executed at the log transfer timing (for example, just before it) in such a manner that a portion necessary for a subsequent operation analysis or the like is left in the log storage device (managing terminal 300). For example, log data regarding a specific part of the robot arm 11 used in a specific operation of the robot arm 11 which has been executed at the log transfer timing (for example, just before it) is extracted.

As mentioned above, the specific part regarding the log data which is extracted from the long-term storage log and should be transferred as a long-term storage log to the log storage device may be an arbitrary portion of the robot arm 11. For example, a case of making such control that log data regarding a joint (a control value of an angle thereof and an actual value obtained from the encoder) of the robot arm 11 is extracted from the short-term storage log and transferred as a long-term storage log to the log storage device is considered. The log data regarding the joint (the control value of the angle thereof and the actual value obtained from the encoder) is log data regarding, for example, the arm.

In such a use field that the robot arm 11 is used to assemble an article, it is considered that a specific operation (log data regarding it) which has been executed when the log transfer timing has come, particularly, the specific operation executed in a portion of the finger tips is especially important in the subsequent log analysis. From such a viewpoint, as a specific part of the robot arm 11 regarding the log data which is extracted from the short-term storage log and should be transferred as a long-term storage log to the log storage device, the end effector 12 or the tool T1 attached to the robot arm 11 is considered.

It is also considered that the log transfer timing is set to end timing of a specific unit of the robot program. For example, in the following embodiments 1 and 2, in a control unit such as one line (one step) of the set robot program, short-term storage log data regarding a preset specific part is extracted and transferred as a long-term storage log to the log storage device.

The log transfer timing can be formed by using, for example, a function such as a software interruption of the CPU 201. It is also possible to make control in such a manner that the log transfer is intermittently performed at a predetermined interval by using a timer device such as an RTC (real time clock).

Further, in addition to those log transfer timing, it is also possible to make control in such a manner that the log transfer timing is generated when an emergency stop of the robot arm 11 has been performed. Generally, such a kind of robot system 400 is constructed in such a manner that the emergency stop of the robot arm 11 can be performed by, for example, a judgment of the user through the operation of an emergency stop button (details are not shown here) provided for the operating device 401. A case where when the emergency stop of the robot arm 11 is performed by an error decision of the control unit 200 when a force value of the force sensor 13 or position information of the encoder of each of the joints J1 to J6 shows an abnormal value is also considered. If sensors such as an acceleration sensor and the like are provided for the robot arm 11, such a control that the emergency stop of the robot arm 11 is performed in accordance with, for example, an acceleration (shock) which is applied to the arm is also considered. The log transfer timing can be also generated in any of the foregoing cases of the emergency stop.

In the case of extracting the log data, for example, such control that the long-term storage log selecting unit 24 is allowed to extract log data within a range of a specific time duration and transfer as a log to the log storage device is made. By such a method, a storage capacity of the log storage device can be reduced or a band width of the network necessary for the log transfer can be further reduced. As a range of the time duration during which the log data is extracted, for example, a range of about one second to several seconds to tens of seconds including an operation interval of the specific part is considered. It is also possible to construct in such a manner that an arbitrary value can be set as such a time duration as follows.

Figure 14:
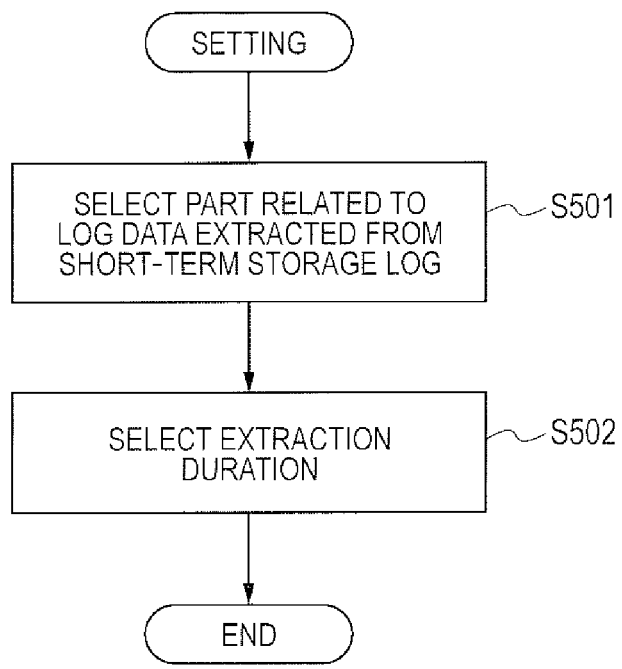
FIG. 14 is a flowchart illustrating an example of a setting procedure of a specific part serving as an extraction target of a long-term storage log and an extraction duration.

There is a possibility that an intention of the log analysis which is performed later changes variably in response to the long-term storage log. Therefore, in the embodiment, it is desirable to construct in such a manner that the specific part of the robot arm 11 regarding the log data to be transferred as a long-term storage log to the log storage device can be set by a setting procedure as illustrated in FIG. 14. In the setting procedure in FIG. 14, the user (administrator) can also set the time duration during which the long-term storage log selecting unit 24 extracts the log data. For example, the procedure in FIG. 14 can be preliminarily stored into a ROM 202 or the like as a control program which is executed by the CPU 201 of the control unit 200.

In step S501 in FIG. 14, the user (administrator) is allowed to set a specific part regarding the log data which is extracted from the short-term storage log such as robot arm 11 (each joint), end effector 12, or tool T1 and should be transferred as a long-term storage log to the log storage device. Such a setting user interface can be constructed by using, for example, a keyboard and a display of the operating device 401 or a keyboard and a display (their details are not shown) of the managing terminal 300. Step S501 corresponds to a log target part setting step of allowing the control unit to set the specific part regarding the log data which is extracted from the short-term storage log and should be transferred as a long-term storage log to the log storage device in the log transferring step.

In step S502 in FIG. 14, the user (administrator) is allowed to set the time duration during which the long-term storage log selecting unit 24 extracts the log data. In a manner similar to step S501, such a user interface can be constructed by using, for example, a keyboard and a display of the operating device 401 or the managing terminal 300. Step S502 corresponds to a log time duration setting step of allowing the long-term storage log selecting unit 24 to set a specific time duration during which the log data is extracted and transferred as a log to the log storage device.

A specific part regarding the log data which is extracted from the short-term storage log such as robot arm 11 (each junction), end effector 12, and tool T1 and should be transferred as a long-term storage log to the log storage device can be preliminarily set by the setting procedure as illustrated in FIG. 14. A specific time duration during which the log data is extracted and transferred as a log to the log storage device can be set by the long-term storage log selecting unit 24.

Figure 5:
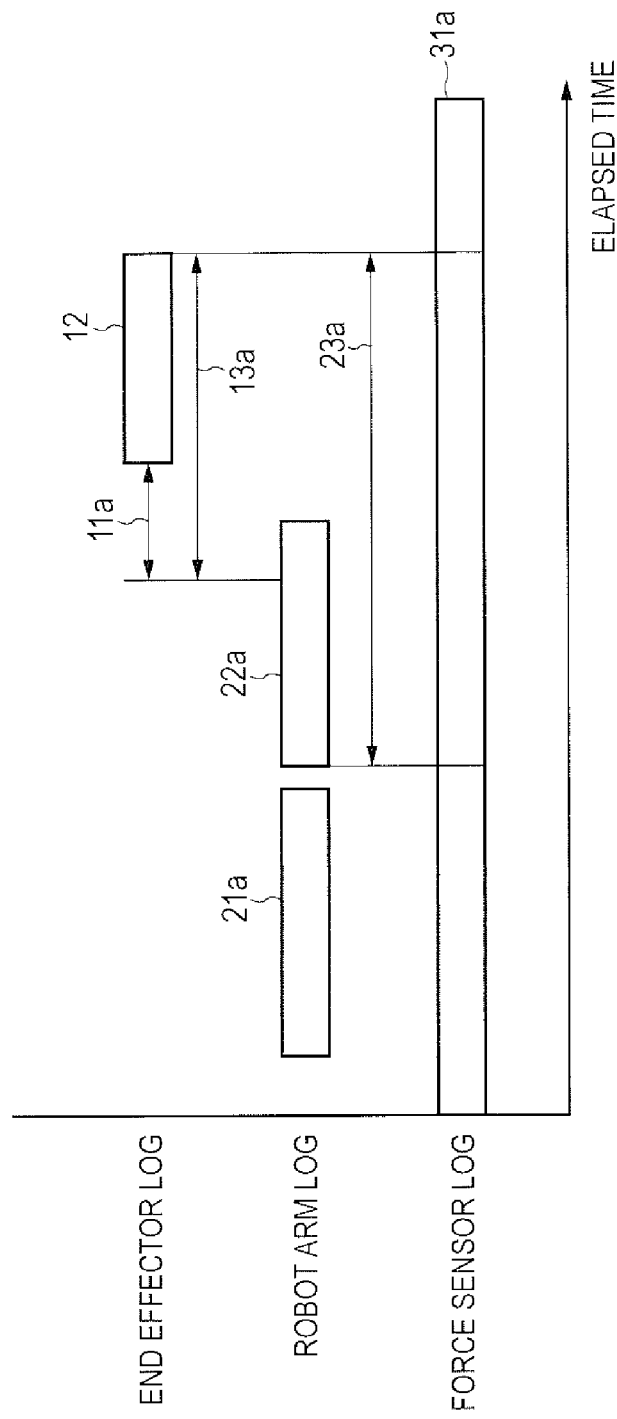
FIG. 5 is an explanatory diagram schematically illustrating a state of the log selection by the long-term storage log selecting unit in the robot system of FIG. 2.

In the embodiments 1 and 2, which will be described hereinafter, a predetermined time (11a) is subtracted from a leading edge of an operation start time of the specific part of the robot arm 11 which has been set as a part regarding the extraction and transfer of the log data, thereby obtaining a time-dependent log extraction range (13a) where the log data should be extracted. Or, further, in the embodiments 1 and 2, which will be described hereinafter, in order to extract and transfer the log data while including the log of the robot arm 11 and the log of the force sensor 13, the extraction range is further extended forwardly to a log extraction range (23a) (FIGS. 5 and 9). In step S502 in FIG. 14, it is sufficient that the specific time duration including the log data of the specific part of the robot arm 11 which has been set as a part regarding at least the extraction and transfer of the log data can be set. For example, in step S502 in FIG. 14, it is considered to construct in such a manner that the predetermined time (11a) to be subtracted from the leading edge of the operation start time of the specific part or (an upper limit of) the whole time duration of the log extraction range (13a: FIGS. 5 and 9) which is determined in accordance with the predetermined time (11a) can be set. Or, further, in step S502 in FIG. 14, it is considered to construct in such a manner that (an upper limit of) the whole time duration of the log extraction range (23a) which is extended in the case where the log of the robot arm 11 and the log of the force sensor 13 are included can be set.

In following embodiments 1 and 2, the end effector 12 or the tool T1 (any one of them) is selected as a specific part regarding the log data which is extracted from the short-term storage log and should be transferred as a long-term storage log to the log storage device. However, by the setting procedure as shown in FIG. 14, a plurality of specific parts can be also set as specific parts regarding the log data which is extracted from the short-term storage log and should be transferred as a long-term storage log to the log storage device (the following embodiment 2). In such a case, the log data is extracted from the short-term storage log regarding each of the set specific parts and is transferred as a long-term storage log to the log storage device.

For example, if the end effector (12) has been set by the setting procedure as shown in FIG. 14 as a specific part regarding the log data to be transferred as a long-term storage log to the log storage device, control as shown in the following embodiment 1 is made. For example, if the end effector (12) and the tool (T1) have been set by the setting procedure as shown in FIG. 14 as specific parts regarding the log data to be transferred as long-term storage logs to the log storage device, control as shown in the following embodiment 2 is made.

In the following embodiments 1 and 2, it is assumed that the log data regarding the robot arm 11 (each junction) is not especially set as a specific part regarding the log data to be transferred as a long-term storage log to the log storage device. However, in the following embodiments 1 and 2, the log data regarding the robot arm 11 (each junction) can be extracted together as an operation log associated with the operation of the end effector 12 or the tool T1.

Embodiment 1

Figure 2:
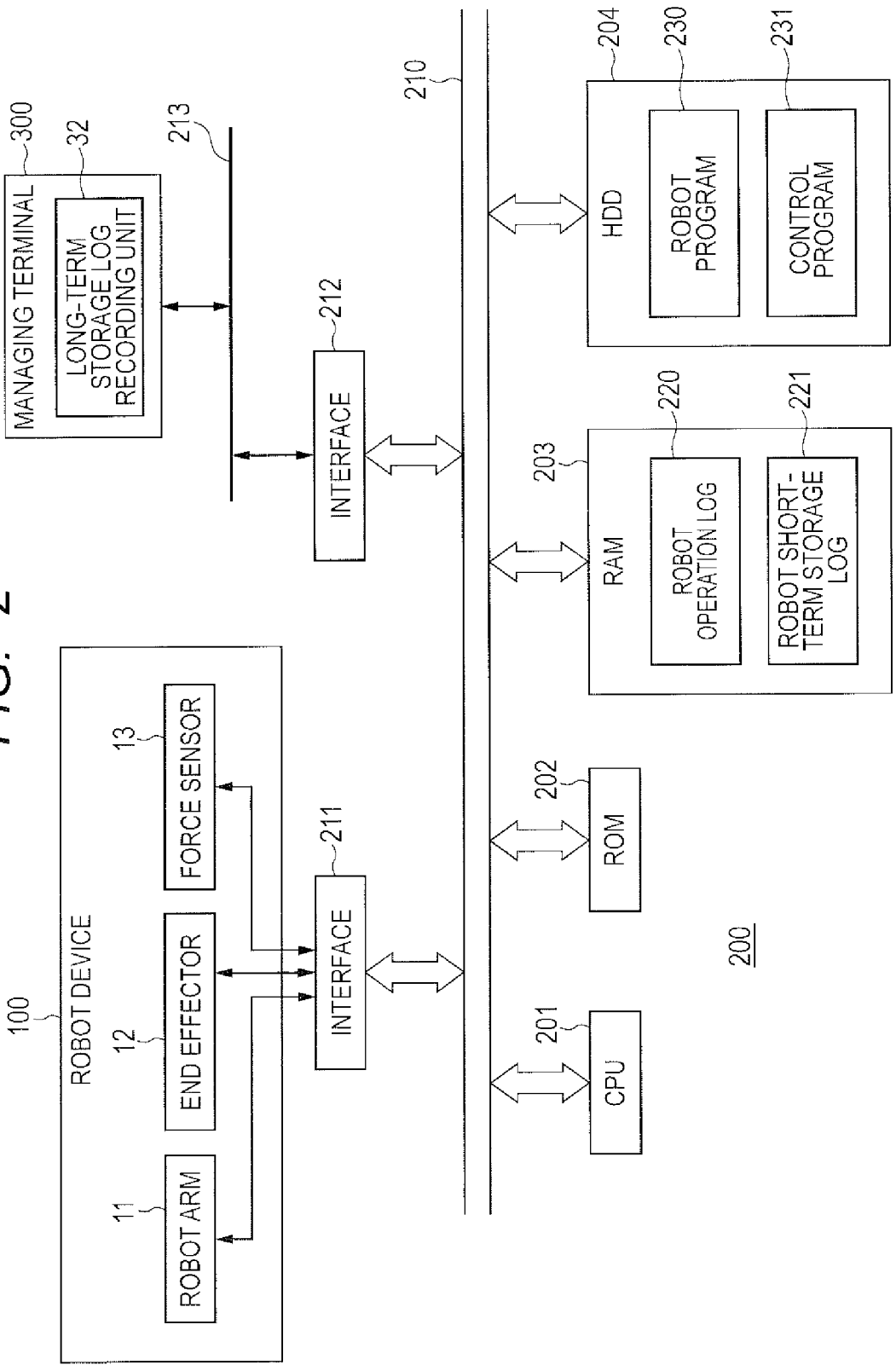
FIG. 2 is a block diagram illustrating a specific construction of the robot system of FIG. 1 as an embodiment 1 of the invention.

FIG. 2 illustrates a construction of a control system of the robot system 400 according to the embodiment 1 of the invention together with a specific construction of the control unit 200. In FIG. 2, members regarding the control when the log transfer timing has come, for example, when the end effector 12 is operating are mainly illustrated.

In FIG. 2, the control unit 200 has the CPU 201 serving as a principal part of the computer and as a control unit (arithmetic operating unit) for controlling the operation of the robot device 100 as a control target as mentioned above. The control unit 200 further has the ROM 202, RAM 203, and HDD 204 (or SD or the like) serving as a storage unit. The control unit 200 also has: an interface 211 for communicating with the robot device 100; and an interface 212 for communicating with the managing terminal 300. The interface 211 is constructed by, for example, an interface of any one of various kinds of serial/parallel systems, a network interface, or the like. The interface 212 is constructed by a network interface (IEEE802,x) of any one of various kinds of wire or wireless connections, and the like.

The ROM 202, RAM 203, HDD 204, and interfaces 211 and 212 are connected to the CPU 201 through a bus 210.

An activating program such as BIOS, boot loader, or the like, firmware necessary for the robot control, and data such as various kinds of control constants have been stored in the ROM 202. The RAM 203 is a storage device for temporarily storing arithmetic operation processing results and the like of the CPU 201, various kinds of data, a robot operation log 220, and a robot short-term storage log 221. For example, the CPU 201 executes programs (230, 231) stored in the ROM 202 or HDD 204 by using the RAM 203 as a work area, so that each of functional blocks (21 to 28) in FIG. 1 is constructed.

The control program 231 and the robot program 230 can be stored in the HDD 204. However, a storage destination of control data and various kinds of programs is not particularly limited to the storage medium mentioned as an example in the embodiment.

For example, a robot control program, teaching point data, a control program associated with the log, which will be described hereinafter, or the like can be stored into the HDD 204 in a file format. Recording media such as various kinds of detachable optical disks, a disk device such as detachable SSD or HDD, or a detachable flash memory can be substituted for the HDD 204. Such various kinds of detachable computer-readable recording media can be used, for example, in order to install or update an access control program constructing a part of the invention into (E(E) PROM area) in the ROM 202. In this case, the control program constructing the invention has been stored in such various kinds of detachable computer-readable recording media and those recording media themselves also construct the invention.

The control program 231 is fundamental software which is read out into the RAM 203 by the boot loader or the like stored in the ROM 202 and corresponds to, for example, a layer of an OS (operating system). The robot program 230 operates in the system of the control program 231. The robot program 230 is prepared by the user (administrator) (or vender of the robot device 100) or the like so as to allow the robot arm 11 to execute a specific operation such as an assembly of an article or the like. Or, the robot program 230 can be also formed by a method whereby the operating device 401 sequentially designates teaching points corresponding to a posture which a predetermined part of the robot arm 11 should be set, or the like.

The robot device 100 is connected to the interface 211. The CPU 201 outputs an angle instruction value (position instruction value) to a driving unit of each joint of the robot arm 11 and the end effector 12 through the bus 210 and the interface 211 and controls the operation of the robot device 100. The control unit 200 receives a force value which is output from the force sensor 13 and uses it for control of the robot arm 11 and the end effector 12. The managing terminal 300 is connected to the interface 212. The interface 212 functions as a network communicating unit 23 illustrated in FIG. 1.

The control unit 200 of the embodiment is constructed as illustrated in FIG. 2. The CPU 201 executes the robot program 230 and the control program 231, so that the functions of the robot program interpreting unit 22, long-term storage log selecting unit 24, log control unit 25, operation log generating unit 27, robot control unit 28, and the like are realized.

The RAM 203 is, for example, a temporary storage device and functions as a short-term storage log recording unit 26 in FIG. 1. In the construction of FIG. 2, the robot program recording unit 21 in FIG. 1 is constructed by the HDD 204. The interface 212 functions as a network communicating unit 23.

In the embodiment, the robot arm 11 operates based on the operation instruction received from the robot control unit 28 of the control unit 200 and returns control results (for example, encoder values of the joints J1 to J6) to the robot control unit 28. The end effector 12 operates based on the operation instruction received from the robot control unit 28 of the control unit 200 and transmits control results to the robot control unit 28. The force value detected by the force sensor 13 arranged at a predetermined position of the robot arm 11, for example, near the attaching position of the end effector 12 or the like is transmitted to the robot control unit 28 of the control unit 200.

The function of each block in FIG. 1 will be described with reference to the foregoing construction of FIG. 2. The robot program describing how to control the robot device 100 and make it operative by the control unit 200 is recorded in the robot program recording unit 21 (HDD 204).

For example, FIG. 12 illustrates a correspondence between statements (1001, 1001, ...) of the robot program and postures (1010, 1011, 1012) of the teaching points corresponding to the respective statements by a format of robot event logs (RE1 to RE4). The teaching point corresponds to 3-dimensional (x, y, z) coordinates which a reference position (for example, a center of an attaching surface of the end effector, or the like) of the robot arm 11 should be set and a rotational position (tX, tY, tZ) around each axis.

The control of the robot event log RE1 is such control that the control unit 200 transmits (SEND) a command for moving (ARM-MOVE) to the posture corresponding to a control value (teaching point) of a reference position of the robot arm 11. An actual value of the posture of the reference position of the robot arm 11 and a value of an error level are included in the robot event log RE2 so as to have the contents returned (RECV) from the robot device 100 side in response to an operation instruction of the robot event log RE1 (1010).

Handshakes of the robot event logs RE3 and RE4 are respective events of an operation (TOOL-MOVE) instruction (1011) of the end effector and an actual value (1012) returned (RECV) from the robot device 100 side. In this example, as a control value of the end effector, a target force value (Force) and a value of its control value (Limit) are included in the operation (TOOL-MOVE) instruction (1011) of the end effector. Position information (Pos) of the end effector and a value of an error level are included in the actual value (1012) returned (RECV) from the robot device 100 side.

For example, the control value of the robot arm 11 in FIG. 12 and its actual value are a posture of a reference position of the specific robot arm 11 by what is called a teaching point expression, and an arm operation log of this format can be also recorded by an arm operation log, which will be described hereinafter. Among the robot event logs RE1 to RE4 in FIG. 12, although the logging of the statement of the robot program is not handled in the control, which will be described hereinafter, the statement of the robot program may be stored as log data in association with the time stamp. Or, as a part of the arm operation log, which will be described hereinafter, the arm operation log of the teaching point format in FIG. 12 and the log data of the statement of the robot program may be extracted together with the log data regarding a specific part, which will be described hereinafter, and may be transferred to the log storage device (managing terminal 300). Particularly, it is considered that if the statement of the robot program is extracted together with the log data regarding the specific part and is stored in the log storage device (managing terminal 300) for a long period of time, the subsequent analysis becomes very easy.

The robot program interpreting unit 22 reads out the robot program stored in the robot program recording unit 21, converts into an operation instruction which can control the robot from the read-out robot program, and instructs to the robot control unit 28. The robot control unit 28 makes the robot device 100 operative in response to the operation instruction received from the robot program interpreting unit 22.

The functions of the robot program interpreting unit 22 and the robot control unit 28 are arbitrarily divided in accordance with an installing method of the control program of the CPU 201 for realizing them. For example, by the robot program interpreting unit 22 and the robot control unit 28, more specific control data which can control the joins J1 to J6 of the arm are directly generated from the teaching point expression describing the posture of the reference position of the robot arm 11 in the robot program. For example, the robot program interpreting unit 22 and the robot control unit 28 generate data of a format such as angle information or the like of the joins J1 to J6 for realizing the posture of the reference position of the robot arm 11 described in the robot program.

The operation instruction information of the robot program interpreting unit 22 is also output to the log control unit 25. The log control unit 25 generates (FIG. 3) the log data in accordance with the operation instruction information of the robot program interpreting unit 22, for example, in accordance with the operation which is being executed by the robot arm 11 at that time point. It is sufficient that the operation instruction information which is sent from the robot program interpreting unit 22 to the log control unit 25 is, for example, instruction information which can perform a log data generation (FIG. 3), which will be described hereinafter, and it is not always necessary that it is equal to the operation instruction information which is output to the robot control unit 28.

Control results and sensor values received from the robot device 100 are transmitted to the operation log generating unit 27. The log control unit 25 transmits a log storage instruction to the operation log generating unit 27 in response to the operation instruction received from the robot program interpreting unit 22. The log control unit 25 also transmits a long-term storage log generation instruction to the long-term storage log selecting unit. The operation log generating unit 27 converts the control results and the force sensor value of the robot device 100 received from the robot control unit 28 into a log format and transmits to the short-term storage log recording unit 26. The log which is generated here is judged based on the log storage instruction received from the log control unit 25. The short-term storage log recording unit 26 stores the data, as a short-term storage log, which was received from the operation log generating unit 27 and converted into the log format. When there is a reading-out request of the log from the long-term storage log selecting unit 24, the short-term storage log recording unit 26 reads out the logs in a designated range and transmits.

When the log storage is instructed from the log control unit 25, the long-term storage log selecting unit 24 extracts a log to be stored for a long period of time from the logs stored in the short-term storage log recording unit 26 and transmits to the network communicating unit 23. The network communicating unit 23 communicates with the managing terminal 300.

The network communicating unit 31 of the managing terminal 300 in FIG. 1 receives the long-term storage log from the control unit 200 and stores into the long-term storage log recording unit 32. The long-term storage log recording unit 32 is constructed by, for example, an HDD, various kinds of optical disk devices, or the like and stores the received long-term storage log.

Subsequently, the robot control in the foregoing construction will be described. The log data extraction and transfer control in the case where the end effector 12 has been set by the foregoing setting procedure as illustrated in FIG. 14 as a specific part regarding the log data to be transferred as a long-term storage log to the log storage device will be described here.

Figure 3:
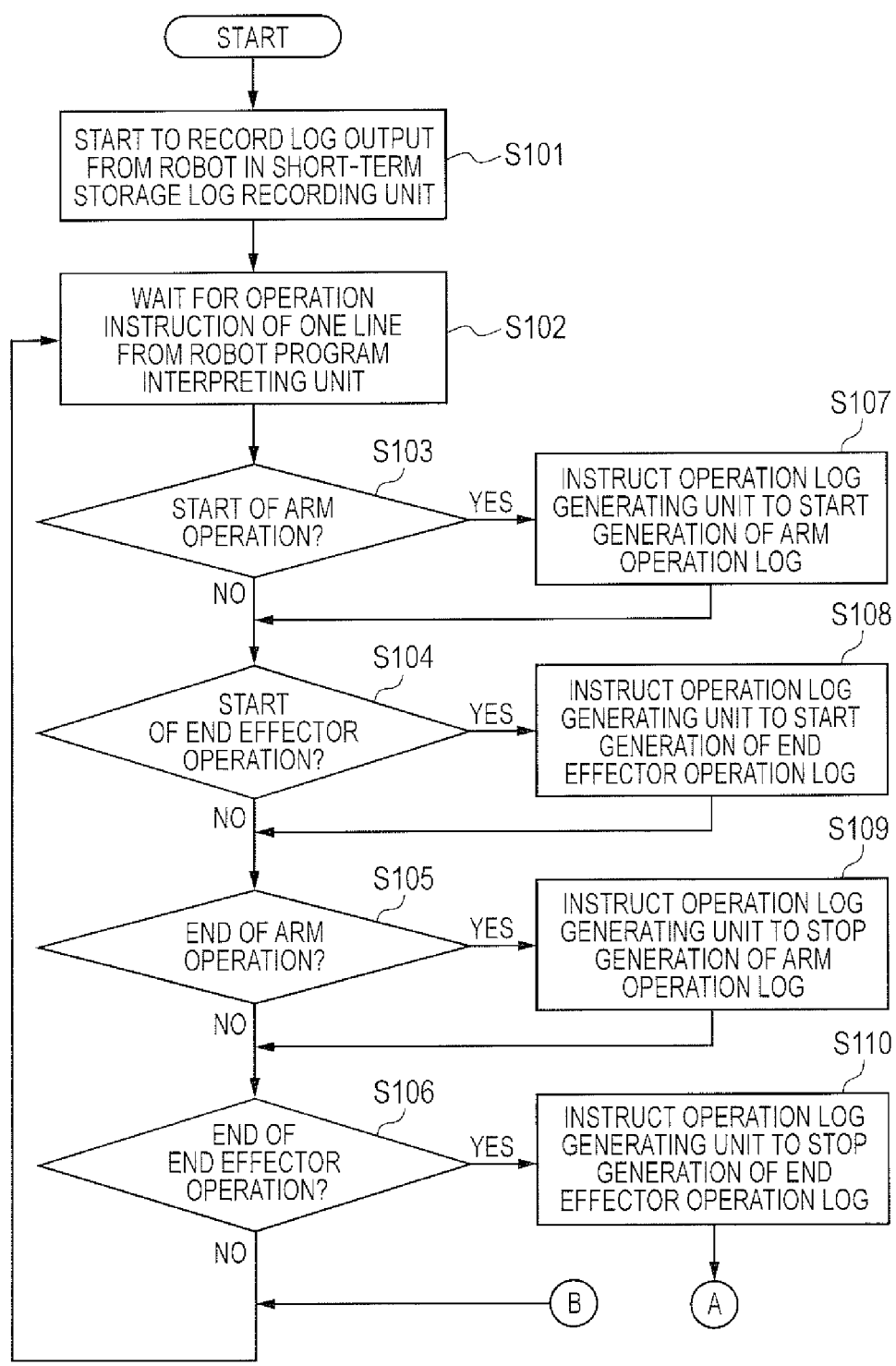
FIG. 3 is a flowchart illustrating a log control procedure by a log control unit in the robot system of FIG. 2.
Figure 4:
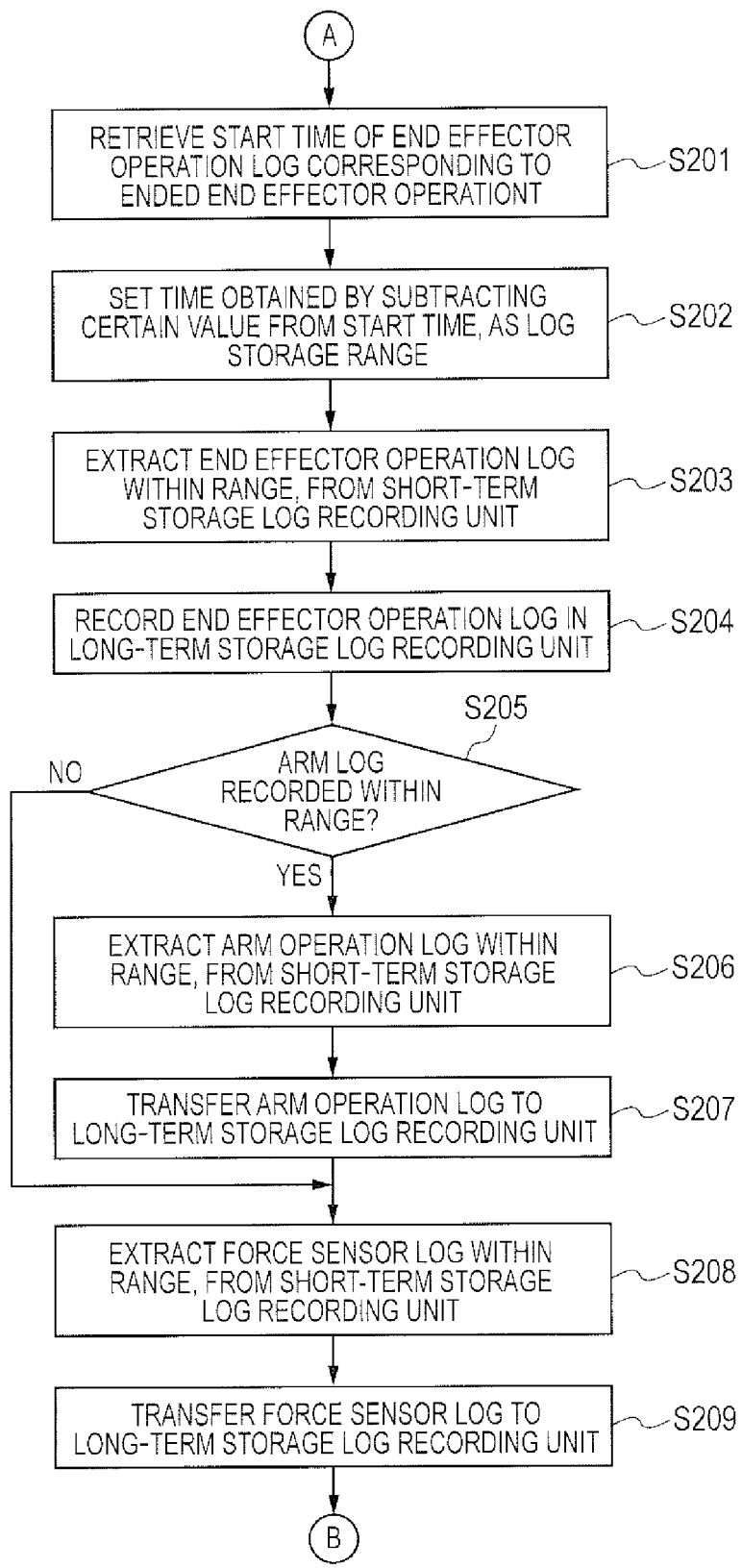
FIG. 4 is a flowchart illustrating a log selecting procedure by a long-term storage log selecting unit in the robot system of FIG. 2.

FIG. 3 illustrates a log data generating step by the log control unit 25 of the control unit 200 in the embodiment. The log data generating step in FIG. 3 is described on the assumption that the execution of the robot program of one line (one step) is set to a unit, and it is executed for a period of time during which the robot arm 11 operates in accordance with the robot program. FIG. 4 illustrates the log data extraction and transfer control which are executed when the execution of the robot program of one line (one step) in FIG. 3 is finished, that is, when the log transfer timing has come.

In step S101 in FIG. 3, the log control unit 25 decides the log to be recorded for a short period of time and instructs the operation log generating unit 27 to generate the operation log. In step S102, the apparatus waits until the operation instruction is received from the robot program interpreting unit 22. When the operation instruction of one line is received, the operation of the robot arm 11 is started.

Steps S103 to S106 are branched in response to the operation instruction received from the robot program interpreting unit 22. In step S103, whether or not the received operation instruction is the start of the arm operation is discriminated. If it is the start of the arm operation, the operation log generating unit 27 is instructed to start the generation of the arm operation log (S107).

In step S105, whether or not the operation instruction is the end of the arm operation is discriminated. If it is the end of the arm operation, the operation log generating unit 27 is instructed to stop the generation of the arm operation log (S109). Similarly, in steps S104 and S108, the start of the log generation of the end effector is instructed. In steps S106 and S110, the stop of the log generation of the end effector is instructed.

As mentioned above, synchronously with the operation of the robot arm 11, the operation log of the robot arm 11 and the operation log of the end effector 12 are generated in accordance with the part which is operating. Those generated operation logs (log data) are stored as short-term storage logs into the short-term storage log recording unit 26 (RAM 203).

FIG. 10A illustrates an example of the operation log of the robot arm 11 generated as mentioned above. As illustrated in the diagram, the operation log of the robot arm 11 in the diagram is constructed by: a time stamp 1001 (date and time) of the event; a target position (control value) 1002 of each of the joints J1 to J6 (corresponding to the $1^{ST}$ axis to the $6^{TH}$ axis in the diagram); and a current position 1003 of each of the joints J1 to J6 (the $1^{ST}$ axis to the $6^{TH}$ axis). The target position (control value) 1002 is, for example, a control value which is transmitted to the robot arm through the robot control unit 28. The current position 1003 is generated by using the encoder output (position information) of each of the joints J1 to J6 obtained through the robot control unit 28. The target position (control value) 1002 and the current position 1003 are expressed by, for example, the number of pulses of a control clock.

FIG. 10B illustrates an example of the operation log of the end effector 12 generated as mentioned above. The operation log of the end effector 12 in the diagram is constructed by: the time stamp 1001 (date and time); a target position (control value) 1004; and a current position 1005. A unit of a numerical value of each log is, for example, the number of pulses in a manner similar to that mentioned above.

FIG. 11A illustrates a construction of a force sensor log in which the output value of the force sensor 13 has been recorded. As for the force sensor 13, it is assumed that, for example, the force sensor log is successively recorded in a force sensor log area which is provided in the RAM 203 and is cyclically used. As illustrated in FIG. 11A, the force sensor log is also constructed by: the time stamp 1001 (date and time); and measured force values (1006, 1007). The force values (1006, 1007) are recorded by a data expression which differs in dependence on a layout and a construction of the force sensor 13. In the example of the diagram, the force value 1006 is a force (FX, FY, FZ) along, for example, 3-dimensional coordinate axes (a center of the attaching surface of the end effector is set to an origin) and its unit is N. The force value 1007 is, for example, a torque (MX, MY, MZ) around the 3-dimensional coordinate axes, and its unit is Nm.

In the time stamp 1001 of the log data illustrated as an example in FIGS. 10A to 11B, "time" is (hour minute second) data divided by ":". Particularly, the "second" data is recorded by, for example, six digits below a decimal point, that is, on a microsecond unit basis in accordance with precision conditions necessary for the robot control and log analysis. Such time/date data can be generated by using a timer device such as an RTC (not shown). Although the time stamp 1001 is shown by the date and the (hour:minute: second) data in order to easily understand it, a recording format in the short-term storage log recording unit 26 (RAM 203) is an arbitrary format. For example, the time/date data can be recorded by a format such as elapsed seconds from the past specific time/date in the RAM 203 or the like.

FIG. 4 is a flowchart showing an extracting and transferring step of the long-term storage log by the long-term storage log selecting unit 24 of the control unit 200 according to the embodiment 1 of the invention.

A start of the process in FIG. 4 is instructed from the log control unit 25 after execution of step S110 in FIG. 3. In step S201 in FIG. 4, a start time of the end effector operation log corresponding to the end effector operation ended in step S110 in FIG. 3 is retrieved.

Subsequently, in step S202, a time duration in a range from the start time retrieved in step S201 to the time obtained by subtracting a specific time duration from the start time is set to a log data extraction (storage) range. Such a specific time duration is a time duration of the foregoing log data extraction and it is assumed that it has been preset in, for example, step S502 in FIG. 14.

In step S203, an end effector operation log within the log data extraction range decided in step S202 is extracted from the short-term storage log recording unit 26 in FIG. 1. The CPU 201 can discriminate whether or not the data is log data corresponding to the specific time duration within the log data extraction range by referring to the time stamp 1001 (FIGS. 10A and 10B) of the log data in the short-term storage log recording unit 26 (RAM 203).

The end effector operation log extracted in step S203 is transferred as a long-term storage log to the managing terminal 300 through the network communicating unit 23 in FIG. 1 in step S204. In the managing terminal 300, the received log is recorded into the long-term storage log recording unit 32.

Subsequently, in step S205, whether or not the arm operation log has been stored within the log extraction range defined in step S202 is discriminated. If the arm operation log has been stored here, in step S206, the corresponding arm operation log is extracted from the short-term storage log recording unit 26 in FIG. 1. In step S207, the extracted arm operation log is transmitted as a long-term storage log to the managing terminal 300 through the network communicating unit 23 in FIG. 1 and is recorded into the long-term storage log recording unit 32.

If the arm operation log has been stored for a long period of time, the log extraction range defined in step S202 is extended to a storage range of a good division of the arm operation log (step S208). In step S209, a force sensor log is extracted based on the log storage range which has been defined in step S202 or has been redefined in step S208. The force sensor log is transmitted as a long-term storage log to the managing terminal 300 through the network communicating unit 23 in FIG. 1 and is recorded into the long-term storage log recording unit 32. When step S210 is ended, the processing routine is returned to (B) in FIG. 3 and the apparatus waits until the next operation instruction is received from the robot program interpreting unit 22 in step S102.

FIG. 5 schematically illustrates a log selection state by the long-term storage log selecting unit 24 in the embodiment. A block-like display in the diagram indicates a range of each log data and the log data of the end effector 12 is shown by the same reference numeral. The lateral direction in FIG. 5 corresponds to, for example, a time axis.

In FIG. 5, with respect to the extraction control of the long-term storage log illustrated in FIG. 4, the start time of the end effector operation is retrieved and the time obtained by subtracting a time (11a) of a certain value is defined as a log extraction range 13a (steps S201 and S202). The operation log of the end effector 12 to be stored is extracted from the log extraction range 13a and is recorded into the long-term storage log recording unit 32 (steps S203 and S204). If the arm operation log is included in the log extraction range 13a, an arm operation log 22a is extracted up to a portion of a good division and is recorded into the long-term storage log recording unit 32 (steps S205 to S207).

That is, if the arm operation log exists, the log extraction range 13a is extended by tracing back to the log extraction range 23a set in consideration of a recording range of the arm operation log 22a (step S208). As a reference of the extension of the log extraction range 23a at this time, for example, it is sufficient to set such a reference that it is extended to a leading edge of the arm operation log (22a) in which the log extraction range 13a exists. An arm operation log 21a is not included in the log extraction range 23a and is not transferred as a long-term storage log.

A force sensor log 31a has successively been recorded in the force sensor log area which is provided in the RAM 203 and is cyclically used. As for the force sensor log 31a, for example, it is sufficient to extract the log data of the force sensor within the log extraction range 23a which was extended with respect to the arm operation log (22a) as mentioned above and transfer.

As mentioned above, according to the embodiment, the robot operation log is designated as a specific part regarding the log data to be transferred as a long-term storage log to the log storage device (managing terminal 300) and the log regarding such a specific part can be extracted and transferred. Therefore, while maintaining the long-term storage of the log of the robot device 100 necessary as operation information, the unnecessary logs can be reduced, a load of the control unit 200 can be reduced, and a transfer band necessary for the transfer can be decreased. In the related arts, when the user tries to obtain a detailed robot operation log, such a manual editing operation that a necessary portion is manually extracted from the log or the like is necessary. However, according to the embodiment, only the log regarding the portion of the robot arm which is necessary (important) in terms of the analyzing operation can be automatically extracted.

In the embodiment 1, the end effector is designated as a specific part regarding the log data to be transferred as a long-term storage log. Not only the log regarding the end effector but also the logs of the robot arm and the force sensor can be extracted and transferred in an interlocking relational manner with the end effector operation. For example, in an operation environment such as a robot cell, the operation information which is important in the analysis at the time of occurrence of a fault is the supplying operation and assembling operation of the work. The supplying operation and assembling operation of the work are executed by the end effector which directly handles the work. Therefore, when the supplying operation and assembling operation of the work are executed by the robot, it is considered that they are the just-precedent robot operation associated with the end effector operation in terms of the analyzing operation.

According to the embodiment, for example, when each of the foregoing log transfer timing has come, the log regarding the end effector can be extracted and transferred. The logs of the robot arm and the force sensor can be also extracted and transferred in an interlocking relational manner with the end effector operation. Therefore, the log regarding the end effector which is important in the analysis at the time of occurrence of a fault or the like and (only the portions of) the log data of the robot arm and the force sensor can be extracted and transferred to the log storage device. Thus, since the logs such as supplying operation, assembling operation, and the like of the work which are particularly important in the analysis are extracted and there is no need to transfer the portions of the other log data which is not so important, the log of the robot device can be extremely efficiently transferred and stored for a long period of time. According to the embodiment, although the long-term storage capacity of the log and the transfer band can be reduced, since the portion of the log data necessary for the analysis is certainly stored, the subsequent log analyzing operation can be accurately performed.

It is assumed that the setting of the specific part regarding the log data which is illustrated in FIG. 14 and should be extracted and the setting of the extraction time duration are performed by the setting operation of the user (administrator). However, for example, a command and a statement which can set the specific part and the extraction time duration may be prepared in language specifications of the robot program. That is, the log target part setting step of setting the specific part and the log time duration setting step in the embodiment can be realized not only by the user setting operation but also by command and statement description of the robot program. Therefore, in the case of describing the robot program for allowing the specific assembling operation to be executed, for example, a specific part regarding the log data which is peculiar to the specific assembling operation and should be extracted and an extraction time duration can be set by using the command and statement. Consequently, an extraction state of the different robot operation logs can be automatically controlled every specific assembling operation, and a load of the user (administrator) can be decreased.

Embodiment 2

In the embodiment, a log data extraction and transfer control in the case where in addition to the end effector (12), the tool (T1) has been set by the foregoing setting procedure as shown in FIG. 14 as a specific part regarding the log data to be transferred as a long-term storage log to the log storage device will be described.

Figure 6:
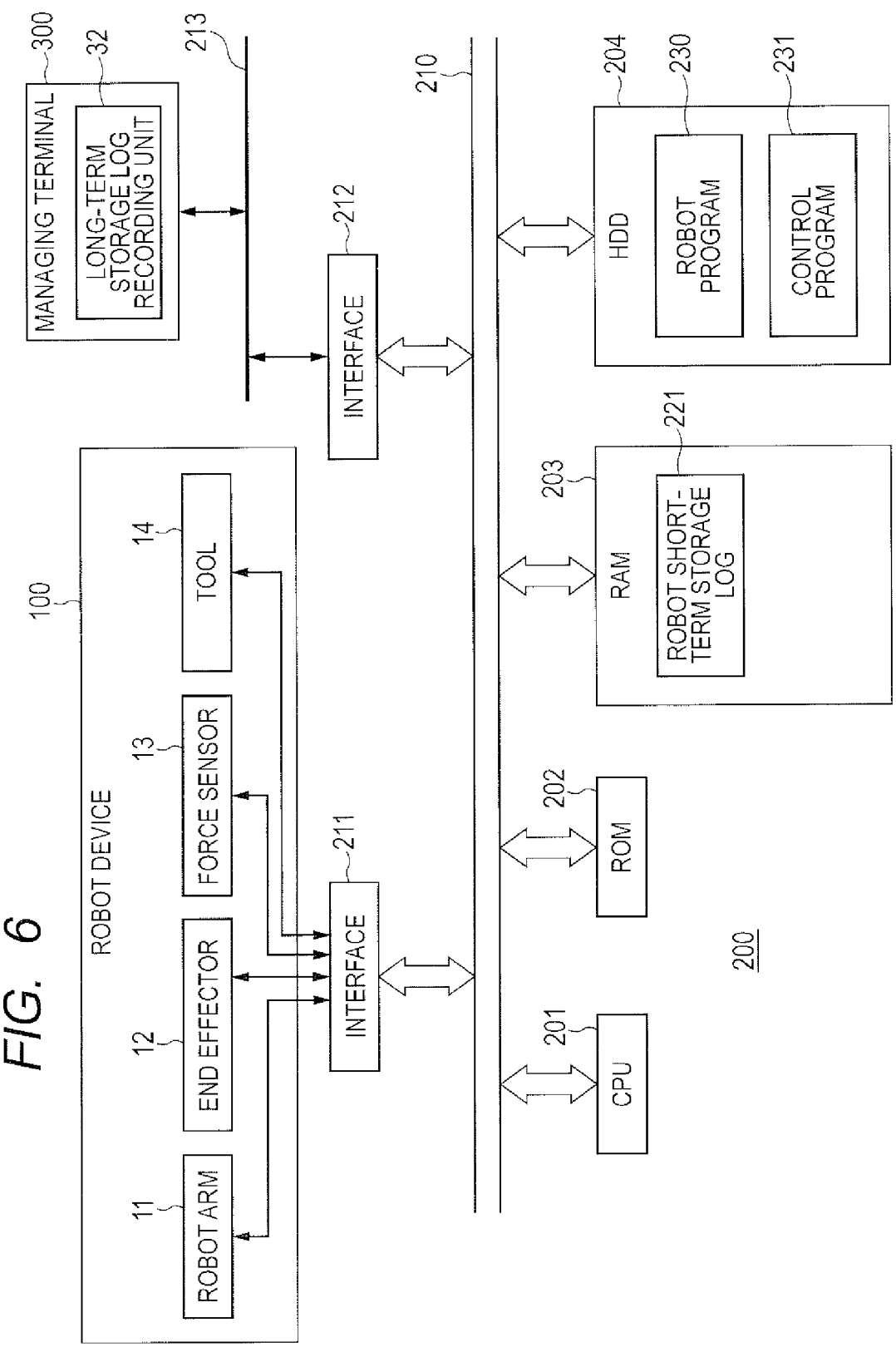
FIG. 6 is a block diagram illustrating a specific construction of the robot system of FIG. 1 as an embodiment 2 of the invention.

FIG. 6 corresponds to FIG. 2 of the foregoing embodiment 1 and is a block diagram schematically illustrating a part of portions according to the embodiment. FIG. 6 differs from FIG. 2 with respect to a point that a tool 14 (foregoing T1) is further shown in the robot device 100. Other construction is similar to that in FIG. 2 and its detailed description is omitted here. It is assumed that a specific construction of the arm in FIG. 13, a functional block construction in FIG. 1, and the like are also similar in the embodiment.

Figure 7:
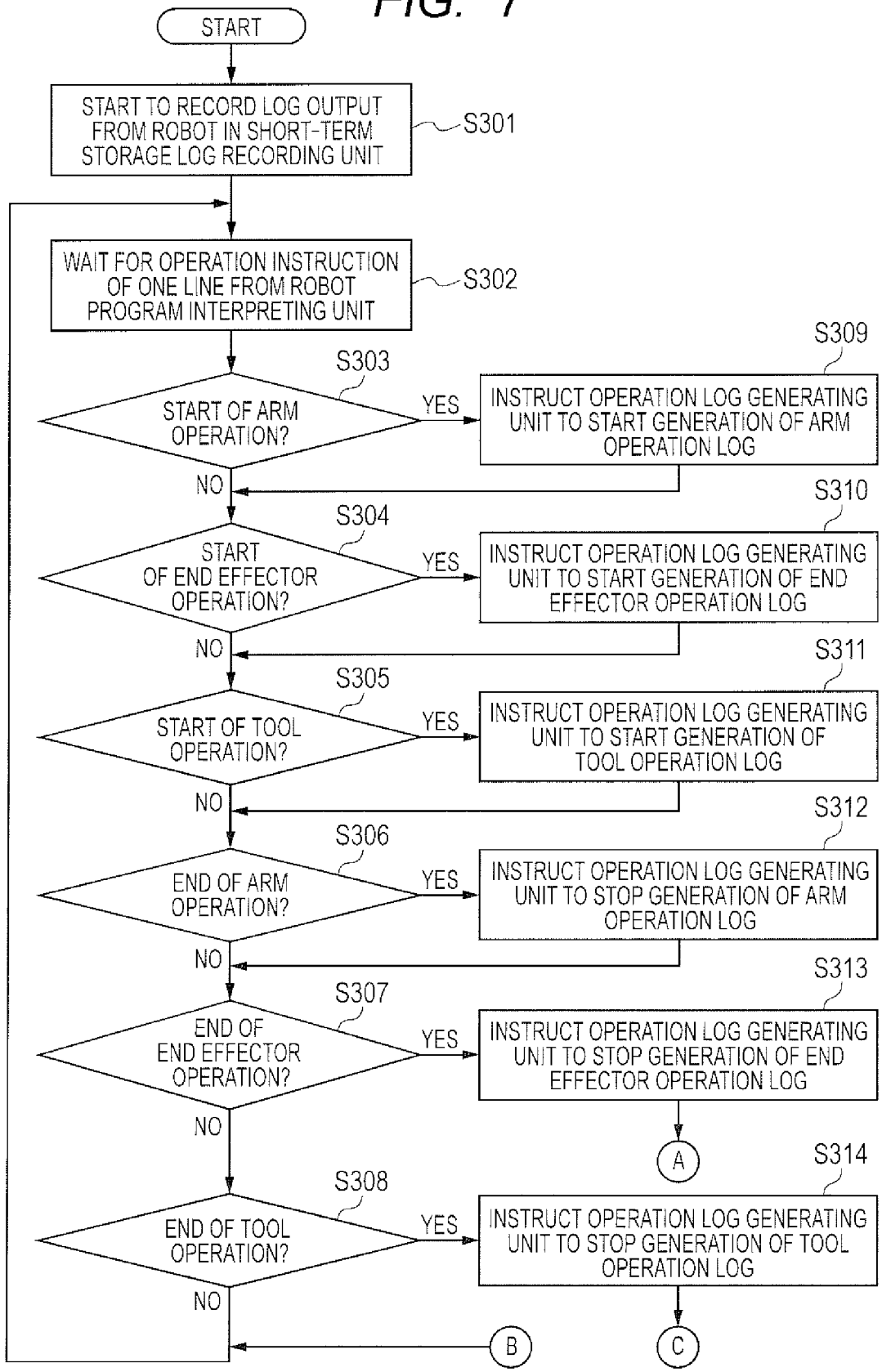
FIG. 7 is a flowchart illustrating a log control procedure by a log control unit in the robot system of FIG. 6.
Figure 8:
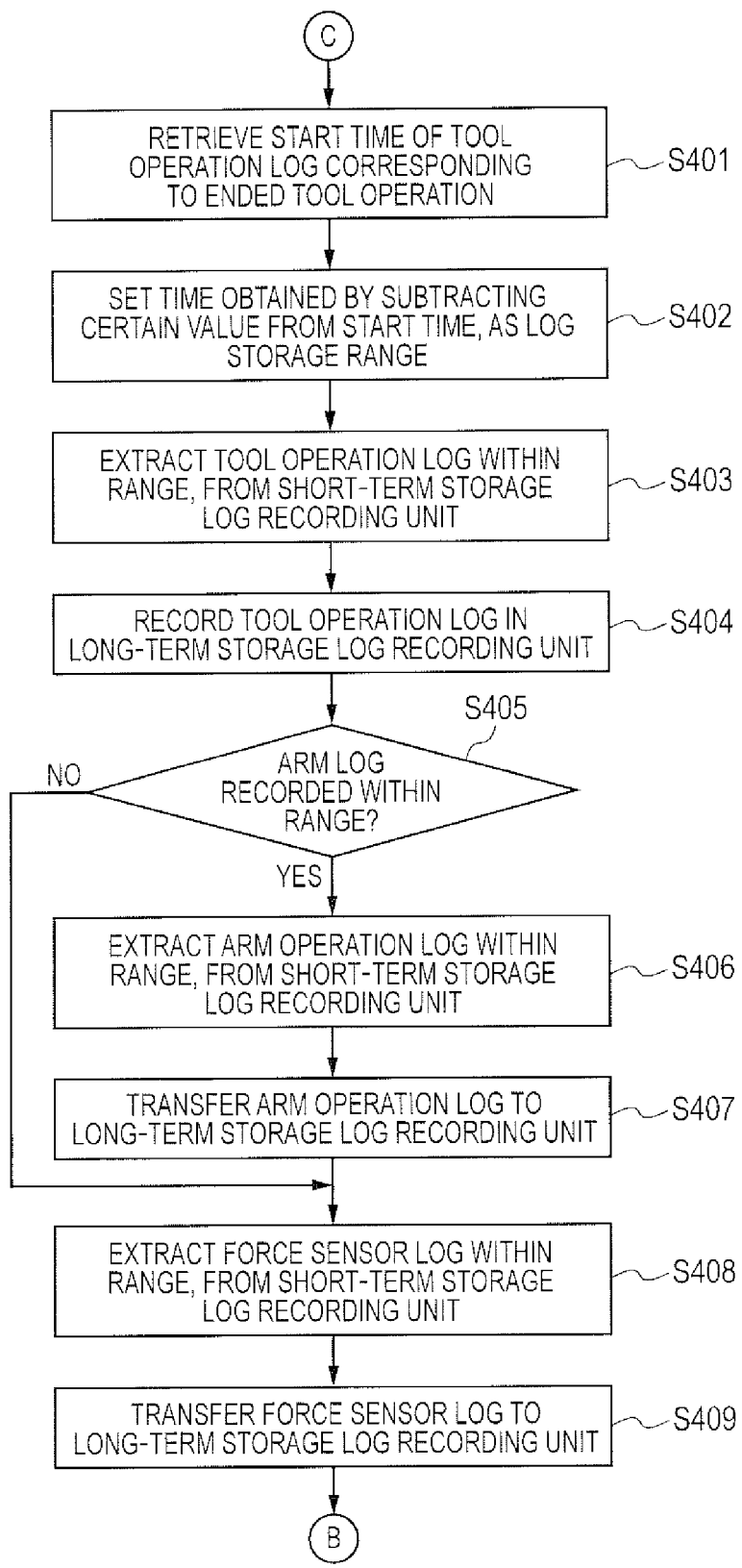
FIG. 8 is a flowchart illustrating a log selecting procedure by a long-term storage log selecting unit in the robot system of FIG. 6.

FIGS. 7 and 8 of the embodiment correspond to FIGS. 3 and 4 in the foregoing embodiment 1, respectively. FIG. 7 illustrates a log data generating step by the log control unit 25 of the control unit 200 in the embodiment. The log data generating step in FIG. 7 is described on the assumption that the execution of the robot program of one line (one step) is set to a unit, and it is executed for a period of time during which the robot arm 11 operates in accordance with the robot program.

FIG. 8 illustrates a log data extraction and transfer control mainly regarding the tool 14 (T1) which are executed when the execution of the robot program of one line (one step) in FIG. 7 is ended, that is, when the log transfer timing has come. When the operation of the end effector in FIG. 7 is ended (steps S307 and S313 in FIG. 7), a log data extraction and transfer control regarding the end effector illustrated in FIG. 4 are executed.

As illustrated in FIG. 6, the embodiment 2 differs from the embodiment 1 with respect to a point that the tool 14 (T1) exists. In the robot cell, in order to realize a multifunctional machine tool, there is a case where the end effector 12 grasps a tool suitable for the operation in the assembling step and uses. As such a kind of tool, for example, there is a (electric) driver for fastening with a screw, an electric chuck to which a pair of tweezers for grasping micro parts have been attached, or the like.

It is assumed that the robot program (FIG. 7) which is executed in the embodiment is described in such a manner that the end effector 12 grasps the tool 14 (T1) and executes the assembling operation (for example, fastening with a screw or the like) by the tool 14 (T1). Although the control procedure of FIGS. 7 and 8 will be described hereinbelow, it is now assumed that with respect to portions which are overlapped with those in FIGS. 3 and 4, only the correspondence of the step numbers are shown, and with respect to details of the contents of the steps which have already been described in the foregoing embodiment 1, their description is omitted.

A whole flow of the robot control (including the log data generating step) in FIG. 7 is similar to that in FIG. 3. In step S301, the log control unit 25 decides the log to be recorded for a short period of time and instructs the operation log generating unit 27 to generate log data. In step S302, the apparatus waits until an operation instruction is received from the robot program interpreting unit 22 and, when the operation instruction of one line is received, the robot arm 11 is allowed to start the operation.

A construction of a loop of steps S302 to S314 in FIG. 7 is obtained by adding steps regarding the tool to the construction of a loop shown as steps S102 to S110 in FIG. 3. The steps regarding the tool in FIG. 7 (not shown in FIG. 3) are steps S305, S311, S308, and S314. Other steps are similar to those in FIG. 3 and a correspondence of the step numbers is defined as follows.

Steps S303 and S309 in FIG. 7 correspond to steps S103 and S107 in FIG. 3 and are steps of starting a generation of an arm operation log as short-term storage log data in accordance with the arm operation. Steps S304 and S310 in FIG. 7 correspond to steps S104 and S108 in FIG. 3 and are steps of starting a generation of an end effector operation log as short-term storage log data in accordance with the end effector operation.

Steps S306 and S312 in FIG. 7 correspond to steps S105 and S109 in FIG. 3 and are steps of stopping the generation of the arm operation log in accordance with the end of the arm operation. Steps S307 and S313 in FIG. 7 correspond to steps S106 and S110 in FIG. 3 and are steps of stopping the generation of the end effector operation log in accordance with the end of the end effector operation.

When the generation of the end effector operation log is stopped in accordance with the end of the end effector operation (step S313), the processing routine is branched to step S201 in FIG. 4. By the control in FIG. 4, an extraction of the log data regarding (mainly) the end effector similar to that in the foregoing embodiment 1 and a transferring process to the log storage device (managing terminal 300) are executed.

An operation judgment related to the tool 14 (T1) and the start and stop of the generation of the log data are also executed in a manner similar to that mentioned above. First, in step S305 in FIG. 7, whether or not the received operation instruction is the start of the operation of the tool is discriminated. If it is the start of the tool operation, in step S311, the operation log generating unit 27 is instructed to start the generation of the tool operation log. In step S308, whether or not the operation instruction is the end of the tool operation. If it is the end of the tool operation, in step S314, the operation log generating unit 27 is instructed to stop the generation of the tool operation log.

If the generation of the tool operation log has been stopped (step S314) in accordance with the end of the tool operation, the processing routine is branched to step S401 in FIG. 8 and an extraction of the log data mainly regarding the tool and a transferring process to the log storage device (managing terminal 300) are executed.

The extraction of the log data regarding the tool and the transferring process to the log storage device (managing terminal 300) in FIG. 8 are a flow which is almost similar to the extraction of the log data regarding the end effector and the transferring process to the log storage device (managing terminal 300) in FIG. 4. Steps (almost) corresponding to the step numbers of 200 something in FIG. 4 are shown by the step numbers of 400 something in FIG. 8. FIG. 8 differs from FIG. 4 with respect to a point that steps S401 to S404 are a log storage flow in which the tool operation is set to a start point. However, processes for extracting the log data of the arm log and the force sensor log and transferring to the log storage device (managing terminal 300) after step S405 are substantially the same as those in the foregoing embodiment 1.

In step S401, a start time of the tool operation log corresponding to the operation of the tool 14 (T1) ended in step S314 in FIG. 7 is retrieved.

Subsequently, in step S402, a time duration in a range from the start time retrieved in step S401 to the time obtained by subtracting a specific time duration from the start time is set to a log data extraction range. It is assumed that such a specific time duration is a time duration of the foregoing log data extraction and has been preset in, for example, step S502 in FIG. 14.

In step S403, the tool operation log within the log data extraction range decided in step S402 is extracted from the short-term storage log recording unit 26 in FIG. 1. The CPU 201 can discriminate whether or not the data is log data corresponding to the specific time duration within the log data extraction range by referring to the time stamp 1001 (FIG. 11B) of the log data in the short-term storage log recording unit 26 (RAM 203).

The tool operation log extracted in step S403 is transferred as a long-term storage log to the managing terminal 300 through the network communicating unit 23 in FIG. 1 in step S404. In the managing terminal 300, the received log is recorded into the long-term storage log recording unit 32.

FIG. 9 corresponds to FIG. 5 in the foregoing embodiment 1 and schematically illustrates a log selecting method by the long-term storage log selecting unit according to the embodiment. A block-like display in FIG. 9 indicates a range of each log data and the log data of the tool 14 is shown by the same reference numeral. The lateral direction in FIG. 5 corresponds to, for example, a time axis.

Although the log extraction range 23a is calculated while setting the end effector operation to a start point in the foregoing embodiment 1, FIG. 9 differs therefrom with respect to a point that it is calculated while setting the tool operation (14) to a start point. Other construction is similar to that in FIG. 5. Although the end effector operation log is shown as a blank in FIG. 9, with respect to the end effector operation log, a log data extraction and a transfer are performed in a form similar to FIG. 5 by a branch from foregoing step S313 to the control in FIG. 4.

As mentioned above, as shown in the embodiment 2, in addition to the end effector (12), the tool (14, T1) can be also set as a specific part regarding the log data to be transferred as a long-term storage log to the log storage device. Thus, the log data regarding those specific parts can be extracted as short-term storage logs from the temporary storage device (RAM 203) and transferred to the log storage device (managing terminal 300) in an interlocking relational manner with not only the end effector operation but also the tool operation. The logs of the robot arm and the force sensor can be also extracted in association with each other and can be transferred to the log storage device (managing terminal 300). In a use field like a robot cell for realizing multiple steps, it is difficult to perform the assembling operation by one kind of end effector, and the end effector grasps the tool and performs the operation in accordance with necessity. According to the embodiment, even in such a use field, since the logs regarding not only the end effector but also the tool can be certainly extracted and transferred as long-term storage logs, the data necessary for the analyzing operation at the time of occurrence of a fault can be recorded without losing. Also in the embodiment, such an effect that the long-term storage capacity of the long-term storage log and the transfer band are reduced and the like are almost similar to those in the foregoing embodiment 1.

In the foregoing embodiments 1 and 2, the log transfer timing when the log data is extracted and should be transferred as a long-term storage log to the log storage device is set to the end timing of the specific unit of the robot program. More specifically, in the foregoing embodiments 1 and 2, in the set control unit such as one line (one step) of the robot program, the short-term storage log data regarding the preset specific part is extracted and transferred as a long-term storage log to the log storage device. On the other hand, the foregoing control can be also used in the case of generating the log transfer timing for extracting the log data and transferring as a long-term storage log due to the foregoing periodic timer interruption or emergency stop. For example, control can be made in such a manner that when an event such as periodic timer interruption, emergency stop, or the like has occurred, the processing routine is immediately branched to the extraction and the transferring process of the log data as illustrated in FIGS. 4 and 8 in accordance with the timer interruption or exceptional process (software interruption or the like). In this case, naturally, the generating process of the short-term log data in FIGS. and 7 is executed in accordance with the normal operation of the robot arm 11 in a manner similar to that mentioned above.

The invention can be also realized by such processes that a program for realizing one or more of the functions of the foregoing embodiments is supplied to a system or an apparatus through a network or a storage medium and one or more of processors in a computer of the system or apparatus read out and execute the program. The invention can be also realized by a circuit (for example, ASIC) for realizing one or more of the functions.

Other Embodiments

Embodiment(s) of the present invention can also be realized by a computer of a system or apparatus that reads out and executes computer-executable instructions (e.g., one or more programs) recorded on a storage medium (which may also be referred to more fully as a 'non-transitory computer-readable storage medium' to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-125284, filed Jun. 23, 2015, which is hereby incorporated by reference herein in its entirety.

The invention claimed is:

1. A control method of mechanical equipment equipped with a first device and a second device, the method comprising:
   a referring step of allowing a control unit to refer to first log data regarding an operation of the first device and second log data regarding an operation of the second device; and
   a part log data extracting step of allowing the control unit to extract first part log data from the first log data including a second timing that is traced back by a predetermined time from a first timing at which a predetermined state occurs, and to extract second part log data from the second log data based on the second timing.

2. The control method according to claim 1, further comprising a controlling step of controlling a storing state of a first storage device so that the first part log data and the second part log data extracted in the part log data extracting step are held.

3. The control method according to claim 2, wherein, in the controlling step of controlling the storing state of the first storage device, log data other than the first part log data and the second part log data is not held.

4. The control method according to claim 2, wherein the first storage device is an external storage device or an external managing terminal connected by a network.

5. The control method according to claim 2, wherein the storing state of the first storage device is controlled so that the first part log data and/or the second part log data is compressed and the first part log data and/or the second part log data after the compression is held.

6. The control method according to claim 2, wherein, in the controlling step of controlling the storing state of the first storage device, the storing state of the first storage device is controlled so that the extracted first part log data and/or the extracted second part log data is encrypted using a public key encrypting system and the encrypted first part log data and/or the encrypted second part log data is held.

7. The control method according to claim 2, wherein the controlling step includes transferring the first part log data and the second part log data to the first storage device to control a storing state of the first storage device so that the first part log data and the second part log data are held in the first storage device.

8. The control method according to claim 1, further comprising:
   a first log data generating step of allowing the control unit to generate the first log data regarding the operation of the first device of the mechanical equipment while operating the first device; and
   a second log data generating step of allowing the control unit to generate the second log data regarding the operation of the second device of the mechanical equipment while operating the second device.

9. The control method according to claim 8, wherein, in the first log data generated step and/or the second log data generating step, the control unit generates the first log data and/or the second log data from a control value of the first device or the second device or sensor information which is output from a sensor provided for the first device or the second device.

10. The control method according to claim 1, wherein, in a case where the control unit extracts the second part log data from the second log data in the part log data extracting step, the second log data includes the second log data generated between the first timing and the second timing.

11. The control method according to claim 1, wherein, in the case where the control unit extracts the second part log data from the second log data in the part log data extracting step, when a predetermined operation of the second device ends between the first timing and the second timing, the second part log data includes a part tracked back to a third timing at which the predetermined operation starts.

12. The control method according to claim 1, wherein,
the first device and the second device are mechanically connected to each other, and
when the control unit operates the first device, the second device also moves.

13. The control method according to claim 1, wherein, the control unit executes a predetermined step of the mechanical equipment by operating the first device and the second device in conjunction with each other.

14. The control method according to claim 1, wherein in the part log data extracting step, the control unit does not extract the part log data from log data of a device not related to the first device and/or the second device.

15. The control method according to claim 1, wherein,
the mechanical equipment is a robot system,
the first device is an end effector or a tool, and
the second device is a robot arm connected to the end effector or the tool.

16. The control method according to claim 15, wherein the predetermined time occurs according to an output value of a sensor provided on the robot arm.

17. The control method according to claim 15,
wherein the robot system includes a sensor operable to detect information of a force, and
wherein the method further comprises:
an extracting step of extracting third part log data from third log data indicative of information of the force detected by the sensor through an operation of the robot arm; and
a controlling step of controlling a storing state of a first storage device so that the third part log data are held in the first storage device.

18. The control method according to claim 17, wherein the extracting step includes extracting, as the third part log data, a portion corresponding to an operation time of the robot arm from the third log data.

19. The control method according to claim 17, wherein the extracting step includes extracting, as the third part log data, a portion corresponding to an operation content of the robot arm from the third log data.

20. The control method according to claim 17, wherein the extracting step includes extracting, as the third part log data, a portion corresponding to the first part log data or the second part log data.

21. The control method according to claim 17,
wherein the sensor is operable to detect a load and/or torque as information of the force,
wherein the third log data indicates a value of the load and/or a value of the torque.

22. The control method according to claim 21, wherein the controlling step includes displaying a value along three-dimensional coordinate axes as a value of the load, and displaying a value around the three-dimensional coordinate axes as a value of the torque.

23. The control method according claim 1, further comprising a log target part setting step of allowing the control unit to set a specific part for which log data should be generated, in the first device and/or the second device.

24. The control method according to claim 1, wherein,
the mechanical equipment is equipped with a second storage device,
the control unit stores the first log data and/or the second log data in the second storage device, and
the second storage device stores the log data for a short period of time and the first storage device stores the log data for a long period of time.

25. The control method according to claim 1, further comprising a log time duration setting step of setting the predetermined time.

26. The control method according to claim 1, wherein the predetermined state occurs according to an abnormal state of the mechanical equipment or an emergency stop operation by a user.

27. A non-transitory computer-readable storage medium storing a control program for executing the control method according to claim 17.

28. A manufacturing method of an article, using mechanical equipment equipped with a first device and a second device, the manufacturing method comprising:
a referring step of allowing a control unit to refer to first log data regarding an operation of the first device and second log data regarding an operation of the second device;
a part log data extracting step of allowing the control unit to extract first part log data from the first log data including a second timing that is traced back by a predetermined time from a first timing at which a predetermined state occurs, and to extract second part log data from the second log data based on the second timing; and
a manufacturing step of manufacturing the article by controlling the first device and the second device.

29. Mechanical equipment equipped with a first device and a second device, the equipment comprising:
a referring unit configured to allow a control unit to refer to first log data regarding an operation of the first device and second log data regarding an operation of the second device; and
a part log data extracting unit configured to allow the control unit to extract first part log data from the first log data including a second timing that is traced back by a predetermined time from a first timing at which a predetermined state occurs, and to extract second part log data from the second log data based on the second timing.

30. The mechanical equipment according to claim 29, further comprising a deleting unit configured to be able to delete the first part log data and/or the second part log data.

* * * * *